US 12,303,785 B2

(12) United States Patent
Takemura et al.

(10) Patent No.: US 12,303,785 B2
(45) Date of Patent: May 20, 2025

(54) NON-TRANSITORY COMPUTER READABLE MEDIUM, INFORMATION PROCESSING METHOD, GAME DEVICE, AND INFORMATION PROCESSING SYSTEM FOR PARTY CREATION

(71) Applicant: CYGAMES, INC., Tokyo (JP)

(72) Inventors: Riku Takemura, Tokyo (JP); Yuta Ono, Tokyo (JP); Kentaro Sato, Tokyo (JP); Shinichi Miura, Tokyo (JP)

(73) Assignee: CYGAMES, INC., Tokyo (JP)

( * ) Notice: Subject to any disclaimer, the term of this patent is extended or adjusted under 35 U.S.C. 154(b) by 323 days.

(21) Appl. No.: 17/469,110

(22) Filed: Sep. 8, 2021

(65) Prior Publication Data
US 2021/0402296 A1 Dec. 30, 2021

Related U.S. Application Data

(63) Continuation of application No. PCT/JP2020/008385, filed on Feb. 28, 2020.

(30) Foreign Application Priority Data

Mar. 8, 2019 (JP) .................................. 2019-043076
Jun. 6, 2019 (JP) .................................. 2019-106370

(51) Int. Cl.
*A63F 13/49* (2014.01)
*A63F 13/46* (2014.01)
(Continued)

(52) U.S. Cl.
CPC .............. *A63F 13/49* (2014.09); *A63F 13/46* (2014.09); *A63F 13/48* (2014.09); *A63F 13/795* (2014.09);
(Continued)

(58) Field of Classification Search
CPC .......... A63F 13/46; A63F 13/48; A63F 13/49; A63F 13/795; A63F 2300/61; A63F 2300/554; A63F 2300/556
(Continued)

(56) References Cited

U.S. PATENT DOCUMENTS 9,717,990 B2 * 8/2017 Kuroda .................. A63F 13/358
2010/0255917 A1 * 10/2010 Nemoto .................. A63F 13/69
463/43

(Continued)

FOREIGN PATENT DOCUMENTS

JP 2015008985 A 1/2015
JP 6348726 B2 6/2018

OTHER PUBLICATIONS

About deck composition, Kai-ri-sei Million Arthur management site [online], section of "Deck composition images" Jul. 1, 2016<https://web.archive.org/web/20160701063013/https://www.kairisei-ma.jp/help/2014/08/post-1.html> (4 pages).

(Continued)

*Primary Examiner* — Dmitry Suhol
*Assistant Examiner* — Alyssa N Brandley
(74) *Attorney, Agent, or Firm* — Osha Bergman Watanabe & Burton LLP

(57) ABSTRACT

A non-transitory computer readable medium stores a program causing a computer to execute: saving, among a plurality of character IDs associated with a player ID, a character ID selected by a player operation in a party saving area associated with the player ID; executing a prescribed game by using the character ID stored in the party saving area; creating, on the basis of the fact that the prescribed game has been terminated, game result information including the character ID used when executing the prescribed game; sharing at least one of text information and the game result information between at least two players on the basis of the player operation; displaying the shared text information and game result information; and saving, on the basis of a prescribed operation on the displayed game result information, the character ID included in the game result infor- (Continued)

mation in the party saving area associated with the player ID of a player who has performed the operation.

10 Claims, 44 Drawing Sheets

(51) Int. Cl.
*A63F 13/48* (2014.01)
*A63F 13/533* (2014.01)
*A63F 13/795* (2014.01)

(52) U.S. Cl.
CPC ....... *A63F 13/533* (2014.09); *A63F 2300/554* (2013.01); *A63F 2300/556* (2013.01); *A63F 2300/61* (2013.01)

(58) Field of Classification Search
USPC .......................................................... 463/24
See application file for complete search history.

(56) References Cited

U.S. PATENT DOCUMENTS

| | | | | |
|---|---|---|---|---|
| 2014/0135119 | A1* | 5/2014 | Yamada | A63F 13/00 463/31 |
| 2014/0235354 | A1* | 8/2014 | Takeuchi | A63F 13/795 709/223 |
| 2015/0224409 | A1 | 8/2015 | Hayashida | |
| 2021/0031113 | A1* | 2/2021 | Ohtani | A63F 13/822 |

OTHER PUBLICATIONS

[10/7 addendum] Ver.4.6.0 Update announcement, Kai-ri-sei Million Arthur management site, section of "Deck browsing function when the quest is cleared and display of card acqusition method" Oct. 6, 2016 <http://www.kairiseima.jp/information/2016/10/161010001006updatev460.html> (7 pages).
Ver. 4.3.0 Update announcement, Kai-ri-sei Million Arthur management site, section of "Implementation of deck name editing function"Jul. 15, 2016 <http://www.kairiseima.jp/information/2016/07/16071100v430.html> (8 pages).
Adding quest clear party browsing function!, Princess Connect! Re: Dive (priconne R) official website, description after "May 28, 2018 (Mon) 15:00 . . . " May 28, 2018 <https://priconne-redive.jp/news/information/1271/> (3 pages).
Office Action issued in Japanese Application No. 2019-043076; Dated May 7, 2019 (5 pages).
Office Action issued in Japanese Application No. 2019-106370; Dated Aug. 27, 2019 (6 pages).
Office Action issued in Japanese Application No. 2019-106370; Dated Oct. 29, 2019 (4 pages).
International Search Report issued in International Application No. PCT/JP2020/008385, mailed Apr. 14, 2020 (8 pages).
Written Opinion issued in International Application No. PCT/JP2020/008385; Dated Apr. 14, 2020 (5 pages).
"Raid on the Million Arthur" Nomal Strategy for the Severed Law Sister (with Deck Introduction), Nov. 9, 2016, <https://www.bilibili.com/video/BV1es411x747/?spm_id_from=333.337.searchcard.all.click> (12 pages).

* cited by examiner

NON-TRANSITORY COMPUTER READABLE MEDIUM, INFORMATION PROCESSING METHOD, GAME DEVICE, AND INFORMATION PROCESSING SYSTEM FOR PARTY CREATION

CROSS REFERENCE TO RELATED APPLICATIONS

This application is a continuation application of International Application No. PCT/JP2020/008385, filed on Feb. 28, 2020, which claims priority to Japanese Patent Application No. 2019-043076, filed on Mar. 8, 2019, and Japanese Patent Application No. 2019-106370, filed on Jun. 6, 2019, the entire contents of which are incorporated by reference herein.

BACKGROUND ART

Technical Field

The present invention relates to an information processing program, an information processing method, a game device, and an information processing system.

For example, as described in Patent Literature 1, a game device that makes it possible to use an information sharing service to post replay data for reproducing a game executed by a player has been conventionally known.

CITATION LIST

Patent Literature

Patent Literature 1: JP 6348726 B

SUMMARY OF INVENTION

Technical Problem

Meanwhile, a game device with which a plurality of characters are selected by a player as a party and a game is executed by using the selected party has also been proposed. With such a game device, in the case where a player wishes to create a party for a game reproduced by means of replay data, the player needs to manually select characters used in the game reproduced by means of the replay data, and thus, the work for creating the party might take time.

The object of the present invention is to provide an information processing program, an information processing method, a game device, and an information processing system that make it possible to easily create a party.

Solution to Problem

In order to solve the problem described above, an information processing program causes a computer to function as: a party saving unit that saves, among a plurality of character IDs associated with a player ID, character IDs selected by a player operation in a party saving area associated with the player ID; a game execution unit that executes a prescribed game by using the character IDs stored in the party saving area; a game result information creation unit that creates, on the basis of the fact that the prescribed game has been terminated, game result information including the character IDs used when executing the prescribed game; an information sharing unit that shares at least one of text information and the game result information between at least two players on the basis of the player operation; a shared information display unit that displays the shared text information and game result information; and a shared party saving unit that saves, on the basis of a prescribed operation on the displayed game result information, the character IDs included in the game result information in the party saving area associated with the player ID of a player who has performed the operation.

The shared party saving unit may determine, on the basis of the plurality of character IDs associated with the player ID, whether the character IDs included in the game result information are associated with the player ID, save the character IDs associated with the player ID in the party saving area, and need not save the character IDs not associated with the player ID in the party saving area.

The game result information may include game kind information, and the shared information display unit may determine a display mode of the game result information on the basis of the game kind information.

The shared information display unit, on the basis of game opening information associated with the player ID of the player who has performed the operation and the shared game result information, may hide at least part of the game result information in the case where it is determined that the prescribed game is in an unopened state with respect to the player ID of the player who has performed the operation.

In order to solve the problem described above, an information processing method includes: a step for saving, among a plurality of character IDs associated with a player ID, character IDs selected by a player operation in a party saving area associated with the player ID; a step for executing a prescribed game by using the character IDs stored in the party saving area; a step for creating, on the basis of a fact that the prescribed game has been terminated, game result information including the character IDs used when executing the prescribed game; a step for sharing at least one of text information and the game result information between at least two players on the basis of the player operation; a step for displaying the shared text information and game result information; and a step for saving, on the basis of a prescribed operation on the displayed game result information, the character IDs included in the game result information in the party saving area associated with the player ID of a player who has performed the operation.

In order to solve the problem described above, a game device includes: a party saving unit that saves, among a plurality of character IDs associated with a player ID, character IDs selected by a player operation in a party saving area associated with the player ID; a game execution unit that executes a prescribed game by using the character IDs stored in the party saving area; a game result information creation unit that creates, on the basis of the fact that the prescribed game has been terminated, game result information including the character IDs used when executing the prescribed game; an information sharing unit that shares at least one of text information and the game result information between at least two players on the basis of the player operation; a shared information display unit that displays the shared text information and game result information; and a shared party saving unit that saves, on the basis of a prescribed operation on the displayed game result information, the character IDs included in the game result information in the party saving area associated with the player ID of a player who has performed the operation.

In order to solve the problem described above, an information processing system includes a terminal device and a server, wherein the terminal device includes an operation unit that accepts a player operation, and a transmission unit that transmits information according to an operation on the operation unit, the server includes a reception unit that receives the information transmitted from the terminal device, a party saving unit that saves, among a plurality of character IDs associated with a player ID, character IDs selected by the player operation in a party saving area associated with the player ID, a game execution unit that executes a prescribed game by using the character IDs stored in the party saving area, a game result information creation unit that creates, on the basis of the fact that the prescribed game has been terminated, game result information including the character IDs used when executing the prescribed game, and an information sharing unit that shares at least one of text information and the game result information between at least two players on the basis of the player operation, the terminal device includes a shared information display unit that receives and displays the text information and the game result information shared by the server, and the server includes a shared party saving unit that saves, on the basis of a prescribed operation on the game result information in the terminal device, the character IDs included in the game result information in the party saving area associated with the player ID of a player who has performed the operation.

Effects of Disclosure

According to the present invention, it is possible to easily create a party.

DESCRIPTION OF EMBODIMENTS

The embodiments of the present invention will be described below in detail with reference to the accompanying drawings. Dimensions, materials, other specific numeric values, etc. indicated in such embodiments are merely examples for facilitating the understanding of the embodiments and do not limit the present invention unless otherwise specifically mentioned. In the present description and the drawings, elements having substantially the same functions and configurations have the same reference signs attached thereto and are not described repeatedly, and elements that are not directly relevant to the present invention are not shown.

First Embodiment (Overall configuration of information processing system S)

Figure 1:
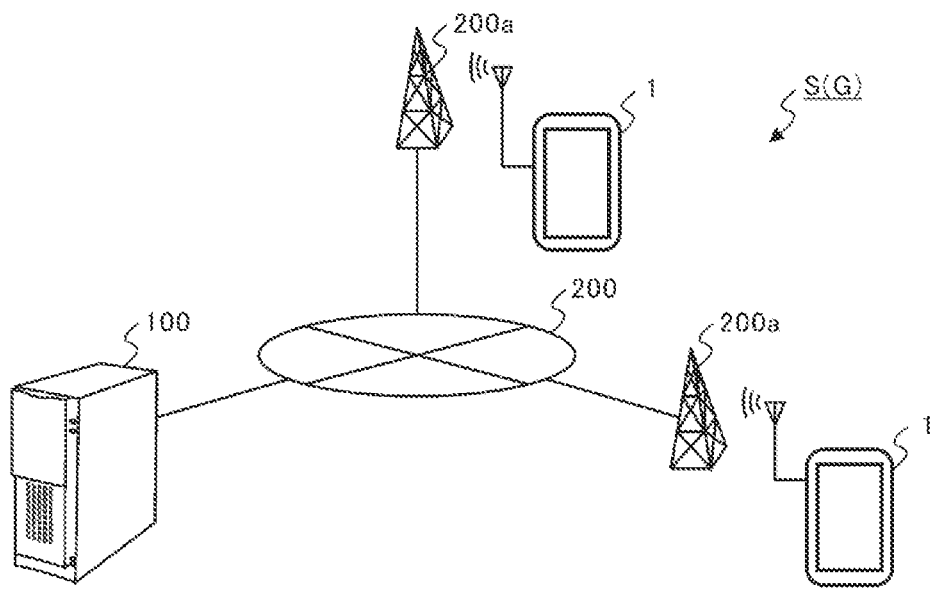
FIG. 1 is an explanatory illustration showing the schematic configuration of an information processing system.

FIG. 1 is an explanatory illustration showing the schematic configuration of an information processing system S. The information processing system S is what is called a client-server system including player terminals 1, a server 100, and a communication network 200 having communication base stations 200a.

The player terminals 1 can establish communication with the server 100 via the communication network 200. The player terminals 1 include a wide variety of electronic devices that can establish a wired or wireless connection with the server 100 for communication. The player terminals 1 include, for example, smartphones, mobile phones, tablet devices, personal computers, game devices, etc. In this embodiment, the case where smartphones are used as the player terminals 1 will be described.

The server 100 is connected with a plurality of player terminals 1 for communication. The server 100 accumulates various kinds of information (player information) for each player ID for identifying a player who plays a game.

The communication base stations 200a are connected with the communication network 200 and perform the wireless transmission and reception of information to and from the player terminals 1. The communication network 200 is implemented by a mobile phone network, the Internet, a LAN (Local Area Network), a private line, or the like, and realizes wired or wireless connection for communication between the player terminals 1 and the server 100.

In the information processing system S according to this embodiment, the player terminals 1 and the server 100 function as a game device G. The player terminals 1 and the server 100 share roles related to the progress control of a game, and cooperation between the player terminals 1 and the server 100 makes it possible for the game to proceed.

(Hardware Configurations of Player Terminal 1 and Server 100)

Figure 2A:
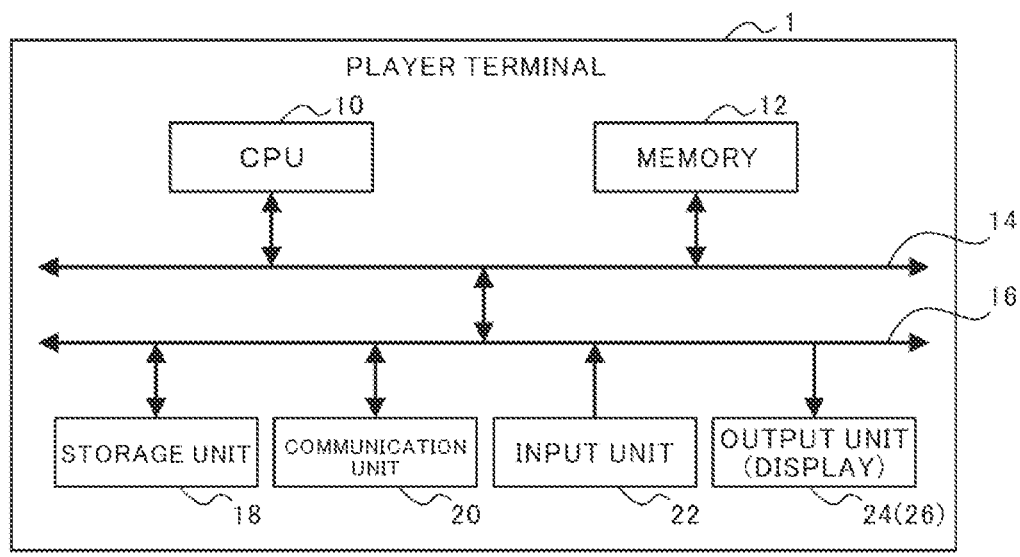
FIG. 2A is a diagram for explaining the hardware configuration of a player terminal.
Figure 2B:
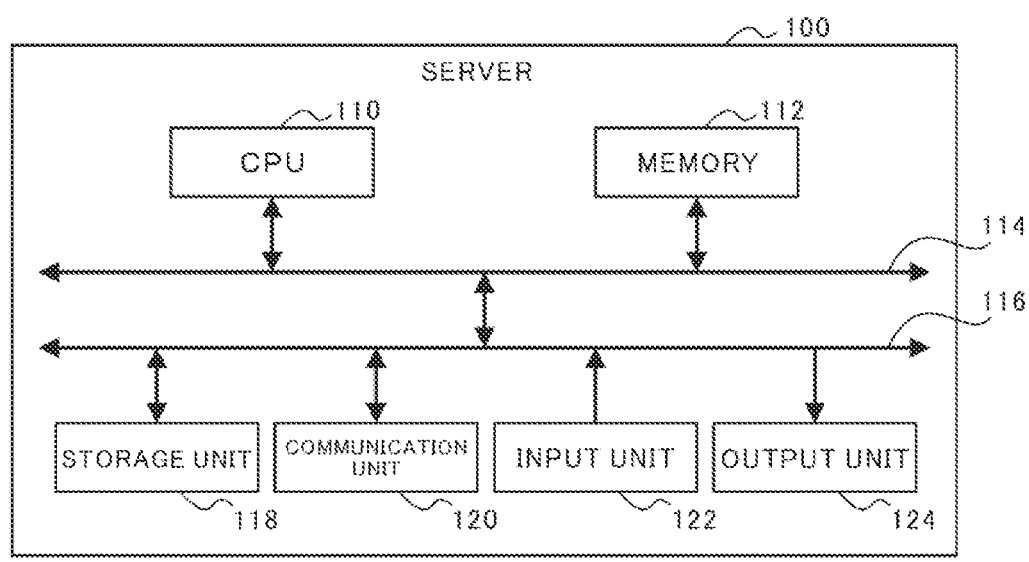
FIG. 2B is a diagram for explaining the hardware configuration of a server.

FIG. 2A is a diagram for explaining the hardware configuration of the player terminal 1. Furthermore, FIG. 2B is a diagram for explaining the hardware configuration of the server 100. As shown in FIG. 2A, the player terminal 1 is configured to include a CPU (Central Processing Unit) 10, a memory 12, a bus 14, an input/output interface 16, a storage unit 18, a communication unit 20, an input unit 22, and an output unit 24.

Furthermore, as shown in FIG. 2B, the server 100 is configured to include a CPU 110, a memory 112, a bus 114, an input/output interface 116, a storage unit 118, a communication unit 120, an input unit 122, and an output unit 124.

Note that the configurations and functions of the CPU 110, the memory 112, the bus 114, the input/output interface 116, the storage unit 118, the communication unit 120, the input unit 122, and the output unit 124 of the server 100 are substantially the same as those of the CPU 10, the memory 12, the bus 14, the input/output interface 16, the storage unit 18, the communication unit 20, the input unit 22, and the output unit 24 of the player terminal 1, respectively. Thus, the hardware configuration of the player terminal 1 will be described below, and a description about the hardware configuration of the server 100 will be omitted.

The CPU 10 runs a program stored in the memory 12 and controls the progress of a game. The memory 12 is implemented by a ROM (Read Only Memory) or a RAM (Random Access Memory), and stores programs and various kinds of data needed for the progress control of a game. The memory 12 is connected to the CPU 10 via the bus 14.

The input/output interface 16 is connected to the bus 14. The storage unit 18, the communication unit 20, the input unit 22, and the output unit 24 are connected to the input/output interface 16.

The storage unit 18 is implemented by a semiconductor memory such as a DRAM (Dynamic Random Access Memory), and stores various kinds of programs and data. At the player terminal 1, the programs and data stored in the storage unit 18 are loaded into the memory 12 (RAM) by the CPU 10.

The communication unit 20 is wirelessly connected with the communication base station 200a for communication and performs the transmission and reception of information such as various kinds of data and programs to and from the server 100 via the communication network 200. At the player terminal 1, programs, etc. received from the server 100 are stored in the memory 12 or the storage unit 18.

The input unit 22 is implemented by, for example, a touchscreen, a button, a keyboard, a mouse, a cross key, an analog controller, or the like via which a player operation is input (by which a player operation is accepted). Furthermore, the input unit 22 may be a dedicated controller provided in the player terminal 1 or connected (externally attached) to the player terminal 1. Furthermore, the input unit 22 may be implemented by an acceleration sensor that detects the inclination or movement of the player terminal 1, or a microphone that detects the voice of a player. That is, the input unit 22 includes a wide variety of devices that enable an input of the player's intention in an identifiable manner.

The output unit 24 is configured to include a display device and a speaker. Note that the output unit 24 may be a device connected (externally attached) to the player terminal 1. In this embodiment, the player terminal 1 includes a display 26 as the output unit 24 and a touchscreen superposed onto the display 26 to serve as the input unit 22.

(Game Content)

Next, the content of a game provided by the information processing system S (game device G) according to this embodiment will be described by using an example. In this embodiment, what is called a battle game in which an ally character battles against an enemy character is provided. Specifically, in a game in this embodiment, a plurality of ally characters are provided. A player organizes a party by selecting a plurality of ally characters (five in this case) from among the provided ally characters. Furthermore, the player can play a plurality of kinds of battle games having different enemy characters or difficulty levels. The objective of a battle game is for the ally characters organized into a party to beat the enemy characters to acquire rewards.

Figure 3A:
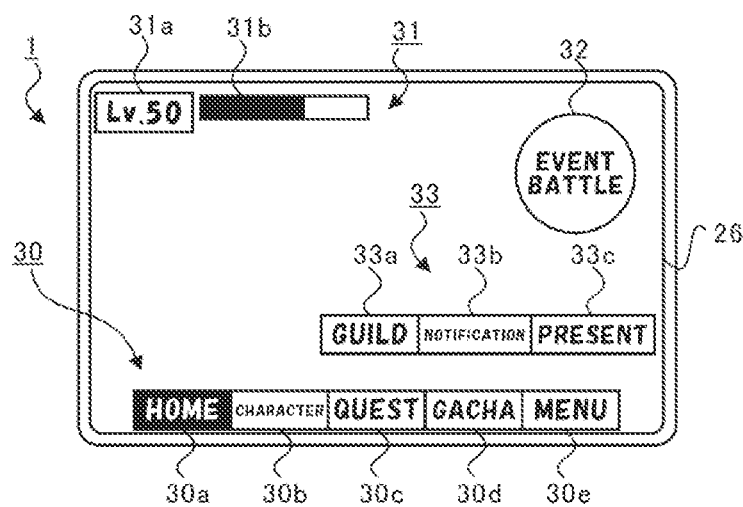
FIG. 3A is an illustration showing an example of a home screen.
Figure 3B:
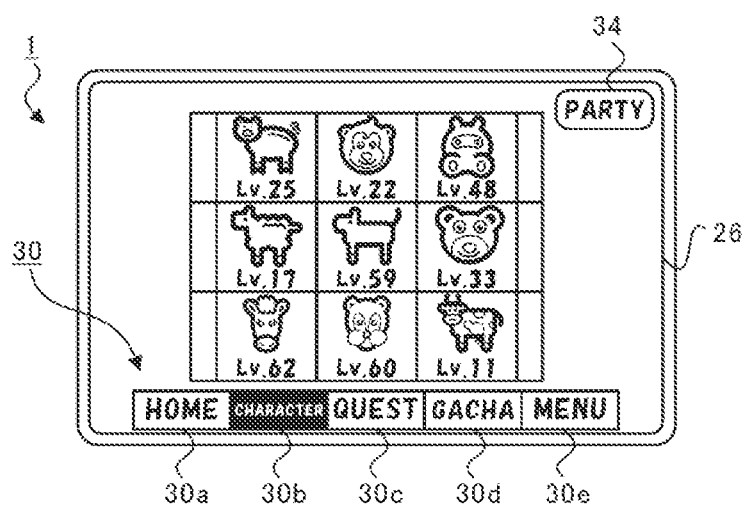
FIG. 3B is an illustration for explaining an example of an ally character confirmation screen.
Figure 3C:
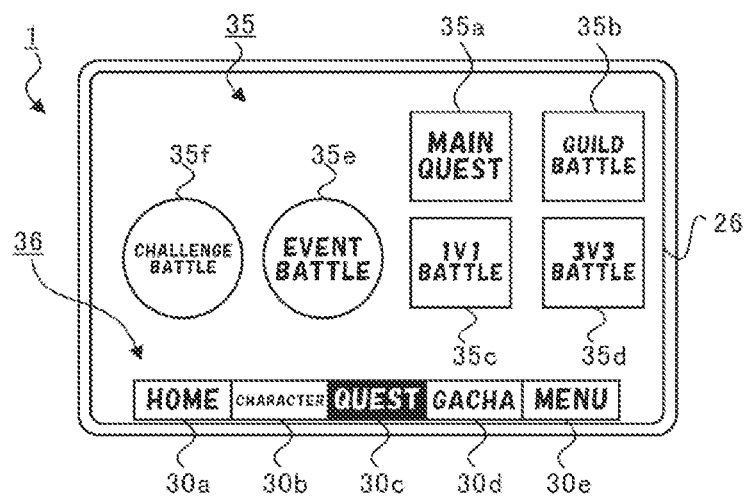
FIG. 3C is an illustration for explaining an example of a quest screen.

FIG. 3A is an illustration showing an example of a home screen. FIG. 3B is an illustration for explaining an example of an ally character confirmation screen. FIG. 3C is an illustration for explaining an example of a quest screen. Game screens shown in FIG. 3A, FIG. 3B, and FIG. 3C are displayed on the display 26 of the player terminal 1. In this embodiment, game screens are roughly classified into ordinary screens and a battle screen.

The ordinary screens are mainly screens for a player to perform various kinds of settings or to confirm information. Meanwhile, the battle screen is a screen displayed on the display 26 from the start to the end of a battle game. Here, all screens other than the battle screen are the ordinary screens. The ordinary screens are roughly classified into five screens, i.e., the home screen shown in FIG. 3A, the ally character confirmation screen shown in FIG. 3B, the quest screen shown in FIG. 3C, and a gacha screen and a menu screen, which are not shown in the drawings.

In the ordinary screens, a menu bar 30 is displayed at the lower part of the display 26. In the menu bar 30, a plurality of operation sections that can be operated (tapped) by a player are provided. In the menu bar 30, a home screen selection operation section 30a shown as "Home", an ally character confirmation screen selection operation section 30b shown as "Character", a quest screen selection operation section 30c shown as "Quest", a gacha screen selection operation section 30d shown as "Dacha", and a menu screen selection operation section 30e shown as "Menu" are provided.

When the home screen selection operation section 30a is tapped, the home screen shown in FIG. 3A is displayed on the display 26. Furthermore, when the ally character confirmation screen selection operation section 30b is tapped, the ally character confirmation screen shown in FIG. 3B is displayed on the display 26. Similarly, when the quest screen selection operation section 30c is tapped, the quest screen shown in FIG. 3C is displayed on the display 26. Furthermore, when the gacha screen selection operation section 30d is tapped, the gacha screen is displayed on the display 26. Furthermore, when the menu screen selection operation section 30e is tapped, the menu screen is displayed on the display 26. Although not described in detail here, in the gacha screen, it is possible to perform a gacha draw in which it is possible to acquire an ally character by a draw. Furthermore, in the menu screen, it is possible to confirm game settings or various kinds of information.

As described above, the ordinary screens are roughly classified into five screens. In the menu bar 30, an operation section corresponding to each screen is highlighted such that a screen displayed on the display 26 can be identified.

The home screen shown in FIG. 3A serves as an initial screen, and a header display area 31 is provided at the top of the screen. In the header display area 31, level information 31a indicating the level of a player associated with a player ID, and stamina display bar 31b indicating the stamina of the player associated with the player ID are displayed.

Note that stamina is a parameter needed to play a battle game. In this embodiment, a plurality of kinds of battle games are provided, and for each battle game, a stamina consumption value needed to play the battle game and the maximum executable number of times per day are set. In the case where a player plays a battle game for which a stamina consumption value needed to play the battle game has been set, since the player plays the battle game by consuming stamina, the player cannot play the battle game in the case where the player does not have enough stamina.

Although not described in detail here, a player can acquire a prescribed value as a player experience value when the player wins a battle game. Furthermore, a player level increases every time the player experience value reaches a certain value. A stamina upper limit value is set for the player level, and the stamina upper limit value becomes higher as the player level increases. The stamina recovers by a prescribed value (e.g., one point) at regular intervals (e.g., five minutes) within a range up to the upper limit value. The stamina display bar 31b is displayed such that the current amount of remaining stamina with respect to the stamina upper limit value can be visually grasped.

Furthermore, there are cases where a notification selection operation section 32 is displayed at the right edge of the home screen. In the case where an event battle, which will be described later, is being held, the notification selection operation section 32 shown as "Event battle" is displayed in the home screen. Furthermore, in the case where a guild battle, which will be described later, is being held, the notification selection operation section 32 shown as "Guild battle" is displayed in the home screen.

Figure 7A:
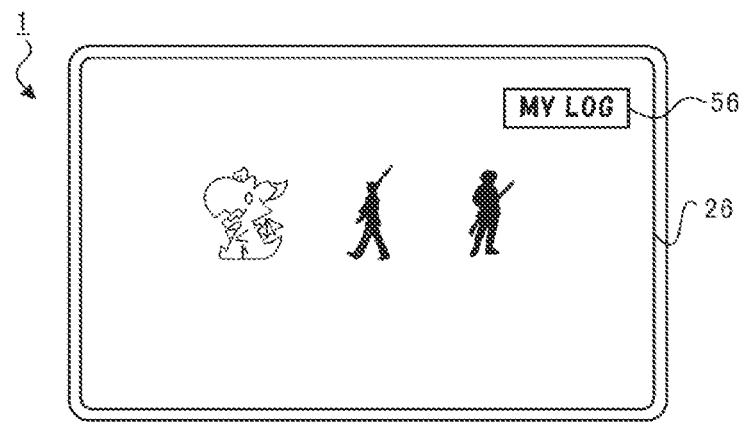
FIG. 7A is an illustration for explaining an example of a guild battle screen.

Then, when the notification selection operation section 32 shown as "Event battle" is tapped, an event battle screen, which is not shown in the drawings, is displayed on the display 26. Furthermore, when the notification selection operation section 32 shown as "Guild battle" is tapped, a guild battle screen shown in FIG. 7A is displayed on the display 26. In the case where neither the event battle nor the guild battle are being held, the notification selection operation section 32 is hidden.

Furthermore, a home menu 33 is displayed between the menu bar 30 and the notification selection operation section 32 in the home screen. A guild screen selection operation section 33a shown as "Guild", a notification screen selection operation section 33b shown as "Notification", and a present screen selection operation section 33c shown as "Present" are provided in the home menu 33.

Figure 9A:
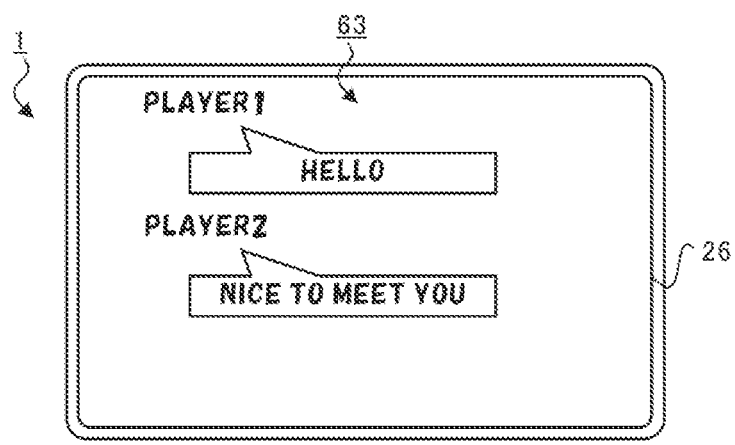
FIG. 9A is an illustration for explaining an example of a guild screen.

When the guild screen selection operation section 33a is tapped, a guild screen shown in FIG. 9A is displayed on the display 26. Furthermore, when the notification screen selection operation section 33b is tapped, a notification screen (not shown in the drawings) in which update information, maintenance information, etc. are displayed is displayed on the display 26. Furthermore, when the present screen selection operation section 33c is tapped, a present screen (not shown in the drawings) in which, for example, items distributed from an administrator are displayed is displayed on the display 26.

In the ally character confirmation screen shown in FIG. 3B, all ally characters (images) corresponding to ally character IDs associated with a player ID are displayed. That is, in the ally character confirmation screen, all ally characters owned by a player are displayed. Since an ally character ID serves to identify an ally character, a different ID is assigned to each ally character. Furthermore, when a player acquires a new ally character by, for example, a gacha draw, the ally character ID of the acquired ally character is associated with the player ID of the player.

An experience value and a level are stored in association with each ally character. The experience value increases in the case where the player wins a battle game, which will be described later, or in the case where a prescribed item is used. The level is set in accordance with the experience value, and the level increases every time the experience value reaches a prescribed value. Note that a level upper limit value is set for each ally character, and the level increases within a range up to the upper limit value.

Furthermore, a fighting power base value such as life points, an offensive power, and a defensive power is set for an ally character on the basis of the level thereof. The player can proceed with a battle game more advantageously as the fighting power of the ally character becomes higher. Furthermore, each base value set for the ally character increases as the level becomes higher.

Furthermore, it is possible to have an ally character wear equipment such as weapons and protective gear (set equipment to the ally character). A value to be added to the offensive power, the defensive power, etc. is set for each piece of equipment. When an ally character wears a piece of equipment, a value to be added for the piece of equipment is added to the base value described above, thereby making it possible to increase the fighting power of the ally character.

Figure 4A:
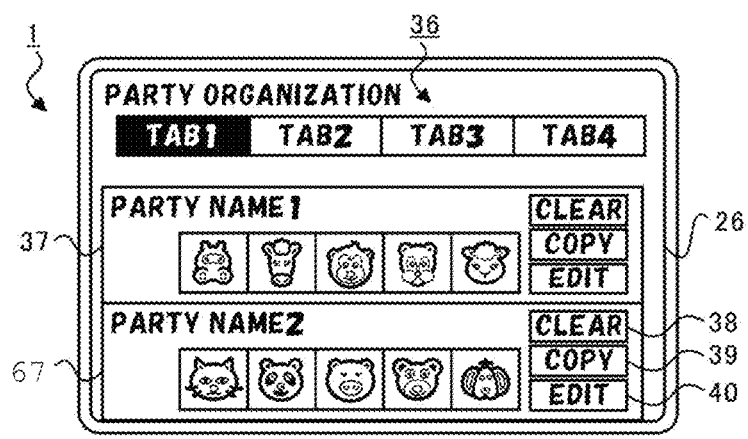
FIG. 4A is an illustration for explaining an example of a party organization screen.

Furthermore, a party screen selection operation section 34 shown as "Party" is displayed at the right edge of the ally character confirmation screen. When the party screen selection operation section 34 is tapped, the party organization screen shown in FIG. 4A is displayed on the display 26. The party organization screen will be described later in detail.

In the quest screen shown in FIG. 3C, a plurality of game kind selection operation sections 35 showing the kinds of provided battle games are displayed. Here, six kinds of battle games are provided, and six game kind selection operation sections 35 are displayed.

In the game kind selection operation section 35, a main quest selection operation section 35*a* shown as "Main quest", a guild battle selection operation section 35*b* shown as "Guild battle", a 1V1 battle selection operation section 35*c* shown as "1V1 battle", a 3V3 battle selection operation section 35*d* shown as "3V3 battle", an event battle selection operation section 35*e* shown as "Event battle", a challenge battle selection operation section 35*f* shown as "Challenge battle" are provided.

Figure 5A:
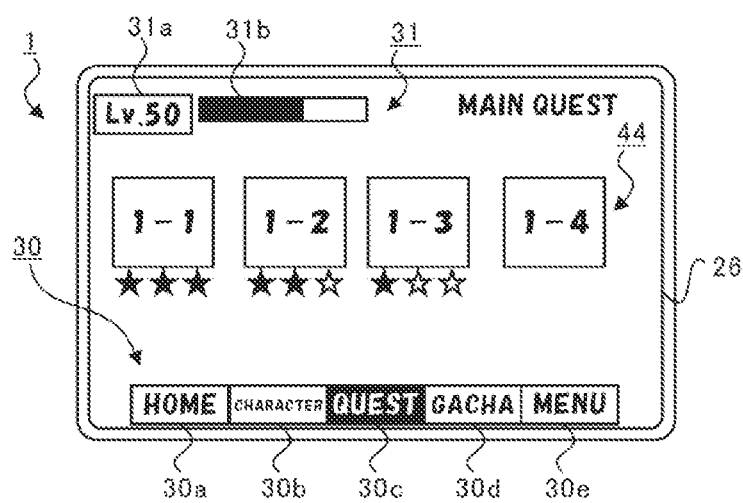
FIG. 5A is an illustration for explaining an example of a main quest screen.

When the main quest selection operation section 35*a* is tapped, the main quest screen shown in FIG. 5A is displayed on the display 26. Furthermore, when the guild battle selection operation section 35*b* is tapped, the guild battle screen shown in FIG. 7A is displayed on the display 26. Similarly, when the 1V1 battle selection operation section 35*c* is tapped, a 1V1 battle screen, which is not shown in the drawings, is displayed on the display 26. Furthermore, when the 3V3 battle selection operation section 35*d* is tapped, a 3V3 battle screen, which is not shown in the drawings, is displayed on the display 26. Furthermore, when the event battle selection operation section 35*e* is tapped, the event battle screen, which is not shown in the drawings, is displayed on the display 26, and when the challenge battle selection operation section 35*f* is tapped, a challenge battle screen, which is not shown in the drawings, is displayed on the display 26.

Note that an opening condition is set for each kind of battle game. The opening condition includes, for example, a condition that the player level is greater than or equal to a prescribed value, and a condition that other prescribed battle games have been cleared. Furthermore, a plurality of battle games (stages) belong to each kind of battle game. An opening condition is also set for each of these battle games. Furthermore, when the opening condition is satisfied, game opening information included in player information is updated.

Whether or not a battle game is open is determined on the basis of the game opening information, and only the game kind selection operation sections 35 of the battle games satisfying the opening condition accept a player operation (tap). Thus, a player can play only battle games that satisfy the opening condition.

Figure 4B:
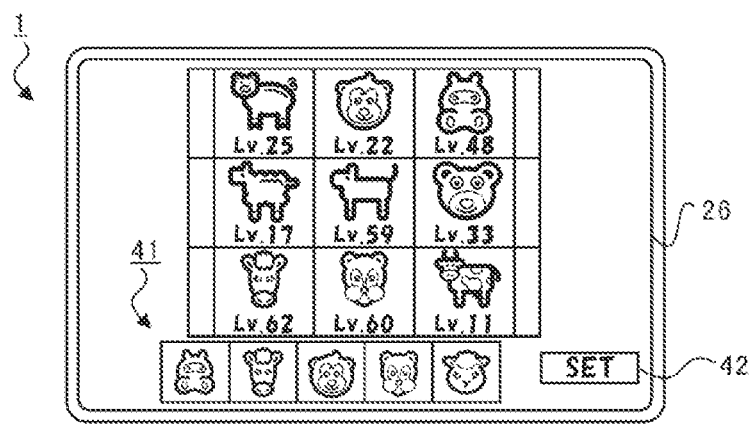
FIG. 4B is an illustration for explaining an example of an ally character selection screen.
Figure 4C:
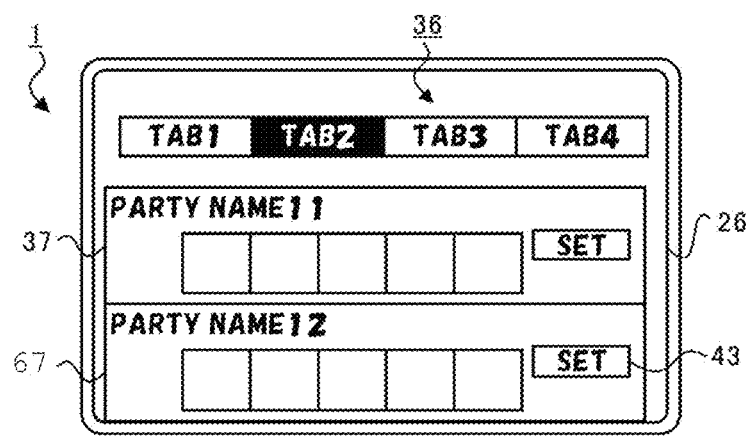
FIG. 4C is an illustration for explaining an example of a party setting screen.

FIG. 4A is an illustration for explaining an example of the party organization screen. FIG. 4B is an illustration for explaining an example of an ally character selection screen. FIG. 4C is an illustration for explaining an example of a party setting screen. Note that the ally character selection screen shown in FIG. 4B and the party setting screen shown in FIG. 4C function as part of the party organization screen.

As described above, when the party screen selection operation section 34 is tapped while the ally character confirmation screen shown in FIG. 3B is displayed on the display 26, the party organization screen shown in FIG. 4A is displayed on the display 26. In this party organization screen, it is possible to create, copy, or delete a party.

In the party organization screen, four selection tabs 36 shown as "Tab 1", "Tab 2", "Tab 3", and "Tab 4" are displayed. Note that the names of the selection tabs 36 can be changed for each player.

When a player operates (taps) one of the selection tabs 36, party display areas 37, 67 corresponding to the operated selection tab 36 are displayed on the display 26. Note that ten party display areas at most can be associated with each selection tab 36.

In each party display area 37, 67, a party name (such as "Party name 1" or "Party name 2") and five ally characters at most are displayed. Note that there is a one-to-one correspondence relation between the first party display area 37 and a party saving area (party saving area associated with a player ID) of a party storage unit 81 (see FIG. 14), which will be described later, and five ally characters at most are displayed in the first party display area 37 on the basis of character IDs stored in the corresponding party saving area. Furthermore, in the first party display area 37, a clear selection operation section 38 shown as "Clear", a copy selection operation section 39 shown as "Copy", and an edit selection operation section 40 shown as "Edit" are provided, respectively.

In an initial state, no ally character is displayed in the party display areas 37, 67. Then, when the edit selection operation section 40 of one of the party display areas 37, 67 is operated (tapped), the ally character selection screen shown in FIG. 4B is displayed on the display 26.

In the ally character selection screen, all ally characters owned by the player are displayed, and a selected ally character display area 41 for displaying selected ally characters is displayed at the bottom.

Then, when the player operates (taps) an ally character, the operated ally character is displayed in the ally character display area 41. Here, the player selects an ally character ID associated with the player ID of the player.

Then, after five ally characters at most are selected by the player, when a setting operation section 42 is operated (tapped) by the player, the character IDs of the selected ally characters are saved in a corresponding party saving area, and the party organization screen shown in FIG. 4A is displayed. The ally characters are displayed in the first party display area 37 on the basis of the saved character IDs. In this manner, the ally characters displayed in the first party display area 37 are created as a single party.

Furthermore, when the copy selection operation section 39 of one of the party display areas 37, 67 is operated (tapped), a party saving area corresponding to the operated party display area 37 is set as a copy source. Furthermore, the party setting screen shown in FIG. 4C is displayed on the display 26. In the party setting screen, the selection tabs 36 and the party display areas 37, 67 are displayed.

Furthermore, in the party setting screen, a setting operation section 43 is displayed in each party display area 37, 67. Then, after one of the selection tabs 36 is operated (tapped), when the setting operation section 43 of the second party display area 67 associated with the operated (tapped) selection tab 36 is operated (tapped), a party saving area corresponding to the operated (tapped) party display area 67 is set as a copy destination.

Then, the party organization screen shown in FIG. 4A is displayed, and in a party saving area corresponding to the party display areas 37, 67 set as a copy destination, ally character IDs stored in the party saving area serving as a copy source are stored. Furthermore, ally characters of a party are displayed in a second party display area 67 corresponding to the party saving area set as a copy destination. In this manner, the ally characters displayed in the second party display area 67 are created (replicated) as a single party.

Furthermore, when the clear selection operation section 38 of one of the party display areas 37, 67 is operated (tapped), ally character IDs stored in a party saving area corresponding to one of the operated party display areas 37, 67 are deleted, and ally characters displayed in the corresponding party display area are cleared (hidden).

Figure 5B:
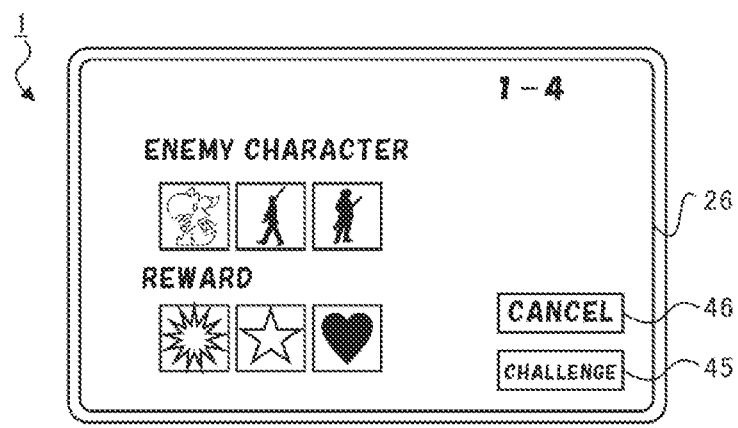
FIG. 5B is an illustration for explaining an example of a main quest selection screen.
Figure 5C:
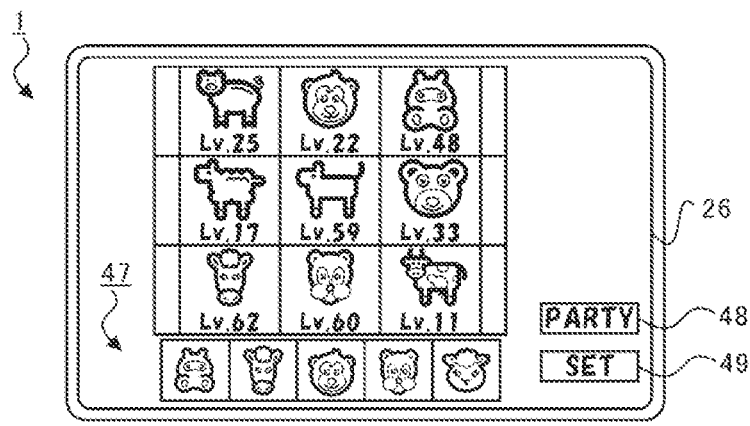
FIG. 5C is an illustration for explaining an example of a party selection screen.

FIG. 5A is an illustration for explaining an example of the main quest screen. FIG. 5B is an illustration for explaining an example of a main quest selection screen. FIG. 5C is an illustration for explaining an example of a party selection screen.

As described above, when the main quest selection operation section 35a is tapped in the game kind operation section 35 shown in FIG. 3C, the main quest screen shown in FIG. 5A is displayed on the display 26.

In the main quest screen, a main quest selection operation section 44 for selecting a plurality of battle games (stages) belonging to a main quest is displayed. Note that the menu bar 30 and the header display area 31 are also displayed in the main quest screen.

In the main quest selection operation section 44, clear information for individual battle games is also displayed. The clear information is indicated by, for example, three stars. In a battle game belonging to the main quest, when the battle game is cleared, stars are acquired in accordance with the number of ally characters whose life points are zero when the battle game is cleared. For example, three stars are acquired in the case where there is no ally character whose life points are zero, two stars are acquired in the case where there is one ally character whose life points are zero, and one star is acquired in the case where there are two or more ally characters whose life points are zero.

In the example in FIG. 5A, three stars have been acquired in the "1-1" battle game, two stars have been acquired in the "1-2" battle game, and one star has been acquired in the "1-3" battle game. Furthermore, it is reported that no star has been acquired in the "1-4" battle game, and thus this battle game has not been cleared.

Note that in the main quest, when a battle game is cleared, the next battle game is opened. Thus, in the example in FIG. 5A, the "1-4" battle game is opened because the battle games up to "1-3" have been cleared, but the battle games thereafter (after "1-5", which are not shown in the drawings) have not been opened.

In the main quest screen, for example, when the main quest selection operation section 44 for the "1-4" battle game is operated (tapped), the main quest selection screen shown in FIG. 5B is displayed on the display 26. In the main quest selection screen, enemy characters appearing in the battle game or items (rewards) that can be acquired in the battle game are displayed. Furthermore, in the main quest selection screen, a challenge selection operation section 45 for challenging the battle game, which is shown as "Challenge", and a cancellation selection operation section 46 for stopping the challenge to the battle game, which is shown as "Cancel", are displayed.

When the cancellation selection operation section 46 is operated (tapped), the main quest screen shown in FIG. 5A is displayed on the display 26, and the challenge to the selected "1-4" battle game is stopped.

Meanwhile, when the challenge selection operation section 45 is operated (tapped), the party selection screen shown in FIG. 5C is displayed on the display 26. In the party selection screen, all ally characters owned by the player are displayed, and a selected ally character display area 47 for displaying selected ally characters is displayed at the bottom.

Furthermore, in the party selection screen, a party selection operation section 48, which is shown as "Party", for selecting a party created by using the party organization screen shown in FIG. 4A, etc., and a setting operation section 49 shown as "Set" are displayed.

When the player operates (taps) a displayed ally character in the party selection screen, the selected ally character is displayed in the selected ally character display area 47. That is, here, among a plurality of ally character IDs associated with the player ID, ally character IDs to be used in a battle game (for setting a party) are selected.

Furthermore, when the party selection operation section 48 is operated (tapped), the party setting screen shown in FIG. 4C is displayed on the display 26. Then, after one of the selection tabs 36 is operated (tapped), when the setting operation section 43 displayed in one of the party display areas 37, 67 corresponding to the operated (tapped) selection tab 36 is operated (tapped), the party selection screen shown in FIG. 5C is displayed on the display 26. Furthermore, ally characters are displayed in the selected ally character display area 47 on the basis of character IDs saved in a party saving area corresponding to the operated (tapped) party display area 37, 67. That is, here, ally character IDs in a created party are selected as ally character IDs to be used in a battle game.

Then, when ally characters (ally character IDs) are selected and the setting operation section 49 is operated (tapped), a battle game is started.

Figure 6A:
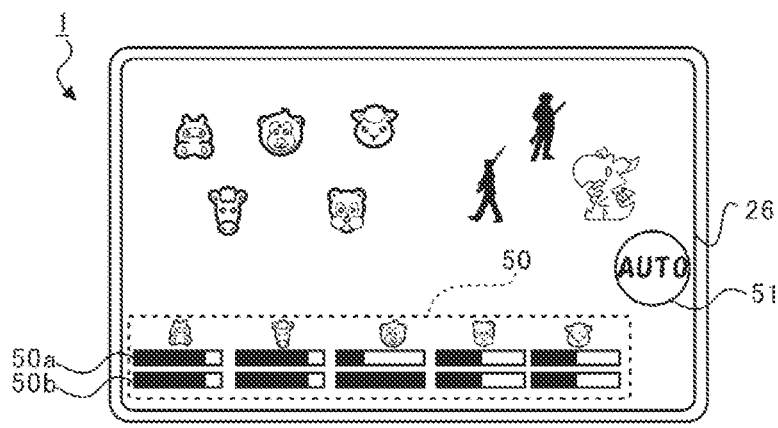
FIG. 6A is an illustration for explaining an example of a battle screen.
Figure 6B:
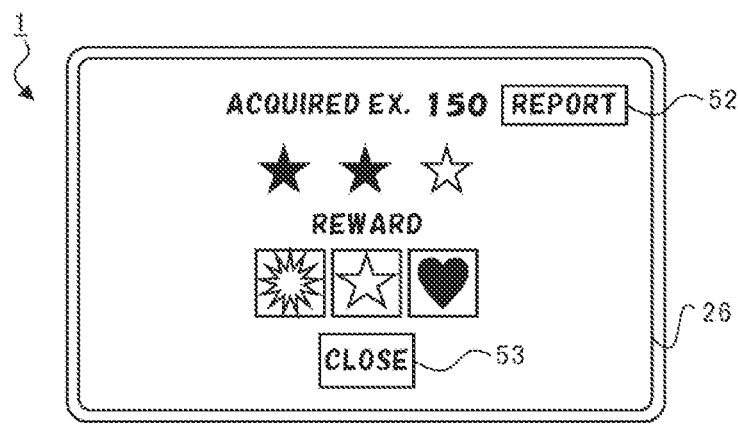
FIG. 6B is an illustration for explaining an example of a result screen.
Figure 6C:
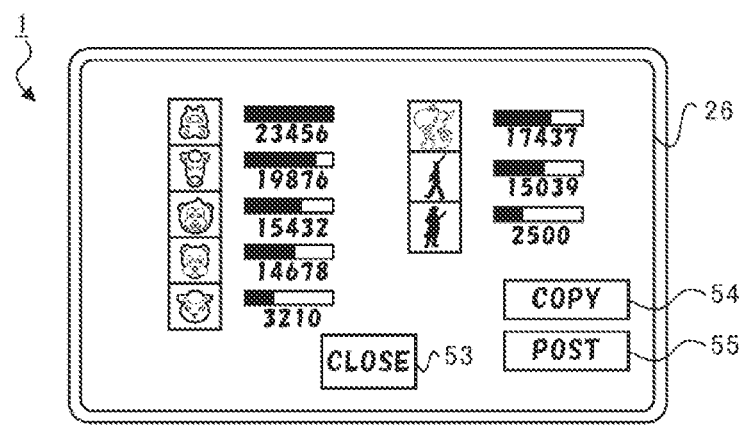
FIG. 6C is an illustration for explaining an example of a report screen.

FIG. 6A is an illustration for explaining an example of a battle screen. FIG. 6B is an illustration for explaining an example of a result screen. FIG. 6C is an illustration for explaining an example of a report screen. When the setting operation section 49 is operated (tapped) in the party selection screen shown in FIG. 5C, a battle game is started.

During the battle game, the battle screen is displayed as shown in FIG. 6A. In the battle screen, ally characters and enemy characters are displayed on the display 26. The ally characters are operated by means of computer control, cause damage to the enemy characters, or are damaged by the enemy characters. Furthermore, the enemy characters are operated by means of computer control, cause damage to the ally characters, or are damaged by the ally characters.

When damage points are given to the enemy characters, the damage points are subtracted from the life points of the enemy characters. Similarly, when damage points are given to the ally characters, the damage points are subtracted from the life points of the ally characters. When the life points of all of the enemy characters become zero, the player wins (clears) the battle game, and when the life points of all of the ally characters become zero, the player loses the battle game.

Here, at the bottom of the battle screen, an ally character display area 50 is provided as shown in FIG. 6A. In the ally character display area 50, life points 50*a* and a killer technique gauge 50*b* for each ally character are displayed. The value of the killer technique gauge 50*b* increases when an ally character is damaged by an enemy character or causes damage to an enemy character. Then, when the killer technique gauge 50*b* reaches a prescribed maximum value, it becomes possible for the ally character to use a killer technique. Killer techniques give enemy characters more damage points than ordinary attacks.

Here, two patterns of methods for using a killer technique are provided. One pattern is that the player operates (taps) an ally character, among ally characters displayed in the ally character display area 50, whose killer technique gauge 50*b* has reached a maximum value. The other pattern is that, when the killer technique gauge 50*b* reaches a maximum value in an auto state, an ally character uses a killer technique by computer control. Note that an auto selection operation section 51 is displayed in the battle screen, and it is possible to switch between the auto state and a manual state in accordance with the operation on the auto selection operation section 51. When the auto selection operation section 51 is operated in the manual state, the state becomes the auto state in which a killer technique is used automatically. Furthermore, when the auto selection operation section 51 is operated in the auto state, the state becomes the manual state in which a killer technique is used manually. Note that, also in the auto state, it is possible to use a killer technique when the player operates (taps) an ally character in a state in which the killer technique gauge 50*b* has reached a maximum value and the killer technique has not been used by computer control.

Then, when the battle game is terminated normally (normal termination), as shown in FIG. 6B, the result screen is displayed on the display 26. FIG. 6B shows, as an example, the result screen when the ally characters have won the battle game.

In the result screen, at least part of game result information for the battle game is displayed, and a report display operation section 52 shown as "Report" and a termination operation section 53 shown as "Close" are displayed.

Note that the game result information includes the ally character IDs of ally characters (party), the enemy character IDs of enemy characters, the surviving situation of the ally characters and the enemy characters when the battle is terminated (whether or not life points are zero when the battle game is terminated), damage points caused (total value), whether the state is the manual state or the auto state, a battle log ID, the kind of battle game (main quest, guild quest, etc.), and information associated with each kind of battle game (clear information, battle game stage, etc.). Regarding whether the state is the manual state or the auto state, the state is the auto state in the case where the state has been the auto state from the beginning to the end of the battle game and a killer technique has not been used manually by the player, and the state is the manual state in other cases. Furthermore, a unique battle log ID is assigned to each battle game. Furthermore, the content of information associated with the kind of battle game is different for each kind of battle game.

When the termination operation section 53 is operated (tapped) in the result screen, the display shown on the display 26 is switched from the battle screen to an ordinary screen. That is, the result screen is part of the battle screen. Note that an ordinary screen to which the result screen is switched may be a screen displayed immediately before switching to the battle screen, or may be a prescribed screen such as the home screen. In this way, when the display of the result screen is terminated, the battle game is terminated.

When the report display operation section 52 is operated (tapped) in the result screen, the report screen shown in FIG. 6C is displayed on the display 26. In the report screen, damage points (total values) caused by the ally characters and the enemy characters are displayed, and a copy selection operation section 54 shown as "Copy", a post selection operation section 55 shown as "Post", and the termination operation section 53 shown as "Close" are displayed.

Here, when the copy selection operation section 54 is operated (tapped), the party used in this battle game is set as a copy source, and the party setting screen shown in FIG. 4C is displayed on the display 26. Then, a copy destination is set by using the party setting screen, and the party serving as a copy source is copied to (created in) the copy destination.

Furthermore, when the post selection operation section 55 is operated (tapped), it is possible to post game result information in the guild screen shown in FIG. 9A, etc. The guild screen will be described later in detail.

Furthermore, when the termination operation section 53 is operated (tapped), the result screen shown in FIG. 6B is displayed on the display 26.

Figure 7B:
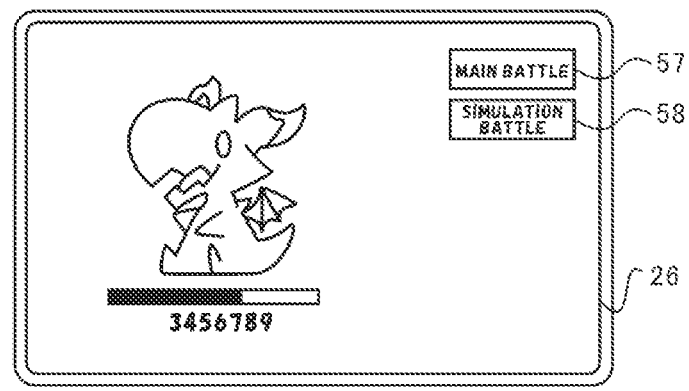
FIG. 7B is an illustration for explaining an example of a guild quest selection screen.
Figure 7C:
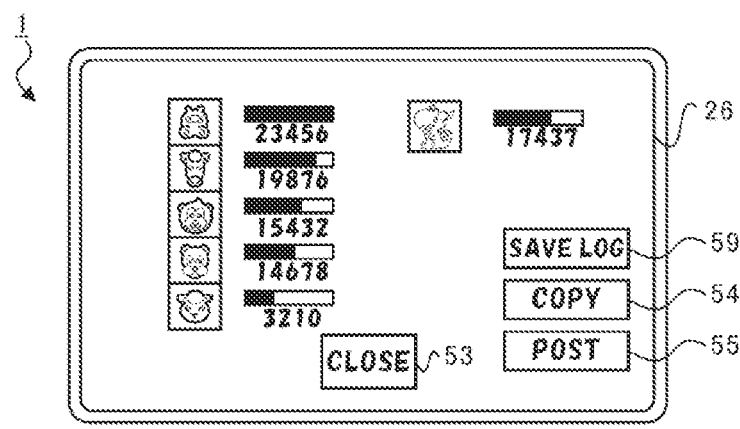
FIG. 7C is an illustration for explaining an example of the report screen for a simulation battle.
Figure 8A:
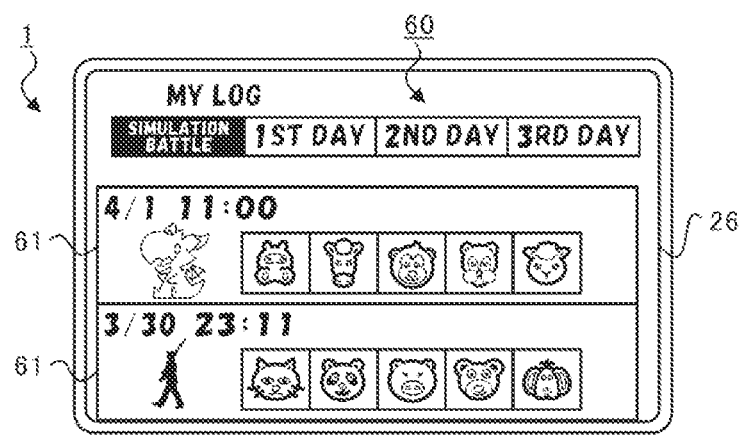
FIG. 8A is an illustration for explaining an example of a my log screen.
Figure 8B:
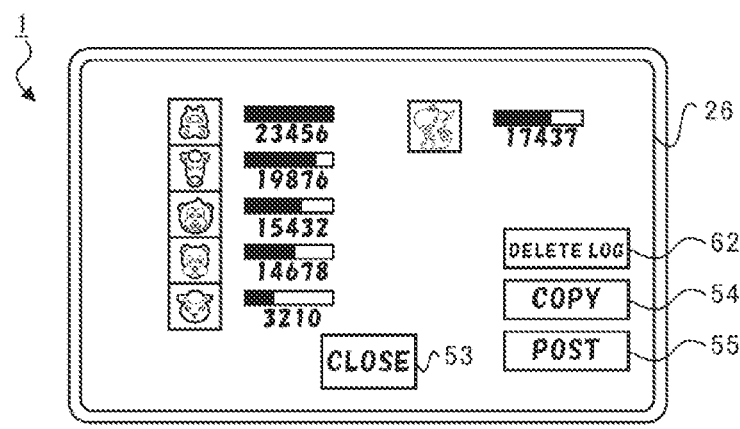
FIG. 8B is an illustration for explaining an example of a log detail screen.

FIG. 7A is an illustration for explaining an example of a guild battle screen. FIG. 7B is an illustration for explaining an example of a guild quest selection screen. FIG. 7C is an illustration for explaining an example of the report screen for a simulation battle. FIG. 8A is an illustration for explaining an example of a my log screen. FIG. 8B is an illustration for explaining an example of a log detail screen.

As described above, for example, when the guild battle selection operation section 35*b* is tapped in the quest screen, the guild battle screen shown in FIG. 7A is displayed on the display 26. The guild battle is held, for example, once a month for three days. The game objective of a battle game in the guild battle is that a plurality of players cooperatively beat enemy characters. Note that cooperable players are limited to guild members, which will be described later. Specifically, more life points are set for the enemy characters compared with enemy characters appearing in a battle game in the main quest, and an object of a battle game in the guild battle is that guild members cooperatively give enemy characters damage points and finally beat the enemy characters. Furthermore, the maximum executable number of times per day for a battle game in the guild battle is set to, for example, three times. Thus, a player can execute a battle game in the guild battle three times at most.

In the guild battle screen, a plurality of enemy characters are displayed, and a my log selection operation section 56 shown as "My log" is displayed. In the guild battle, the my log selection operation section 56 has a function for saving game result information for a battle game as a my log and displaying the saved my log. The my log will be described later.

In the guild battle screen, it is possible to select enemy characters in a prescribed order. When a player wins against an enemy character, it becomes possible for the player to battle against the next enemy character. When the player wins against all enemy characters displayed in the guild battle screen, it becomes possible again for the player to select enemy characters in order starting from a first enemy character.

When a selectable enemy character is operated (tapped) in the guild battle screen, the guild quest selection screen shown in FIG. 7B is displayed on the display 26. In the guild quest selection screen, an enemy character and the life points of the enemy character are displayed, and a main battle selection operation section 57 shown as "Main battle" and a simulation battle selection operation section 58 shown as "Simulation battle" are displayed.

When either the main battle selection operation section 57 or the simulation battle selection operation section 58 is operated (tapped), the party selection screen shown in FIG. 5C is displayed on the display 26. Furthermore, similarly to a battle game in the main quest, when a party to be used in a battle game is selected and the setting operation section 49 is operated (tapped), the battle game is started. Furthermore, when the battle game is terminated, similarly to a battle game in the main quest, the result screen indicating game result information is displayed. When a battle game in a main battle (hereinafter simply referred to as a main battle) is terminated, game result information is automatically saved in a my log.

Here, in the case where the main battle selection operation section 57 is operated to start the main battle, the maximum number of executions is consumed (reduced by one), and the damage points of the enemy character are decreased after the battle game is terminated.

Meanwhile, in the case where the simulation battle selection operation section 58 is operated to start a battle game in a simulation battle (hereinafter simply referred to as a simulation battle), the maximum number of executions is not consumed, and although ally characters battle against an enemy character, the life points of the enemy character are not decreased after the simulation battle is terminated. That is, the simulation battle simulates the main battle. By playing the simulation battle, the player can find a party (combination of ally characters) that gives more damage points to the enemy character.

When the simulation battle is terminated, the result screen is displayed similarly to a battle game in the main quest, and when the report display operation section 52 is operated (tapped), the report screen for the simulation battle is displayed on the display 26 as shown in FIG. 7C. Compared with the result screen for the main quest, a log saving selection section 59 shown as "Save log" is additionally displayed in the report screen for the simulation battle.

When the log saving selection section 59 is operated (tapped), game result information for the simulation battle is saved in a my log.

In the guild battle screen shown in FIG. 7A, when the my log selection operation section 56 is operated (tapped), the my log display screen shown in FIG. 8A is displayed on the display 26.

In the my log display screen, my log selection tabs 60 for selecting the simulation battle, the main battle on the first day, the main battle on the second day, or the main battle on the third day are displayed. Furthermore, the my log display screen displays my log display areas 61 in which a my log for one of the simulation battle, the main battle on the first day, the main battle on the second day, and the main battle on the third day selected via any of the my log selection tabs 60 is displayed.

In the case where a my log selection tab 60 for the simulation battle is selected, ten my log display areas 61 are displayed at most. That is, it is possible to save ten my logs at most in the simulation battle, and when a new my log is saved in a state in which ten my logs have been saved, a my log having the oldest date and time is deleted.

Furthermore, in the case where the main battle on the first day, the second day, or the third day is selected, three my log display areas 61 are displayed at most.

Furthermore, when the my log selection tab 60 for the simulation battle is selected and a my log display area 61 displayed at that time is operated (tapped), the log detail screen shown in FIG. 8B is displayed on the display 26. In the log detail screen, a log deletion operation section 62 shown as "Delete log" is displayed instead of the log saving selection section 59 in the report screen shown in FIG. 7C.

When the log deletion operation section 62 is operated, a my log corresponding to the log detail screen is deleted and is also removed from the my log display screen.

Note that when a my log selection tab 60 for the main battle on the first day, the second day, or the third day is selected and a my log display area 61 displayed at that time is operated, the log detail screen is displayed on the display 26, but the log deletion operation section 62 is hidden at that time. That is, the my logs for the main battle on the first day, the second day, and the third day are not deleted.

Next, a 1V1 battle, a 3V3 battle, an event battle, and a challenge battle will be described. Since the basic parts of battle games in these battles are similar to those of the main quest or the guild battle, the descriptions of these parts will be omitted, and the parts different from those of the main quest or the guild battle will be described.

The 1V1 battle is a battle game for battling against a party for 1V1 associated with another player ID in advance. That is, each player sets a party for 1V1 in advance.

When the 1V1 battle selection operation section 35c is operated, the 1V1 battle screen is displayed on the display 26. In the 1V1 battle screen, a plurality of parties of other players are displayed, and a player selects a party to battle against. Furthermore, similarly to the main quest, a player starts a battle game by setting the party of the player. Note that in a battle game in the 1V1 battle, setting has been made in advance so that it is not possible for a player to switch between an auto state and a manual state, and thus, the battle game always proceeds in the auto state. Thus, in a battle game in the 1V1 battle, it is not possible to use a killer technique manually.

Then, when a battle game in the 1V1 battle is terminated, game result information is displayed on the display 26 similarly to the result screen for the main quest. Furthermore, it is also possible to display the report screen.

The 3V3 battle is a battle game for battling against three parties for 3V3 associated with another player ID in advance. That is, each player sets three parties for 3V3 in advance.

When the 3V3 battle selection operation section 35d is operated, the 3V3 battle screen is displayed on the display 26. In the 3V3 battle screen, a plurality of parties of other players are displayed, and a player selects parties to battle against. Furthermore, the player selects three parties for the battle. Note that since a battle game for the 3V3 battle is always set to the auto state, it is not possible to use a killer technique manually.

Then, when a battle game in the 3V3 battle is terminated, game result information is displayed on the display 26 similarly to the result screen for the main quest. Here, in the 3V3 battle, the first player who wins a battle game twice becomes the winner. Thus, in the case where a player wins or loses a battle game twice in a row, the third battle game is not executed. Furthermore, it is also possible to display the report screen.

The event battle is executed, for example, once in two months for two weeks. When the event battle selection operation section 35e is operated, the event battle screen is displayed on the display 26. Similarly to the main quest, a plurality of battle games are displayed in the event battle screen, and it becomes possible to select the next battle game every time a battle game is cleared. Furthermore, in the event battle, it becomes possible to battle against a boss enemy character when prescribed battle games are cleared. That is, an opening condition that has been set for battling against the boss enemy character is to clear the prescribed battle games, and when the opening condition is satisfied, game opening information included in player information is updated. Furthermore, whether or not a battle game for battling against the boss enemy character has been opened is determined on the basis of the game opening information, and in the case where the opening condition is satisfied, a player can play the battle game for battling against the boss enemy character.

When a battle game in the event battle is terminated, game result information is displayed on the display 26 similarly to the result screen for the main quest. Furthermore, it is also possible to display the report screen.

The challenge battle is executed, for example, once a month for five days. When the challenge battle selection operation section 35f is operated, the challenge battle screen is displayed on the display 26. Similarly to the main quest, a plurality of battle games are displayed in the challenge battle screen, and it becomes possible to select the next battle game every time a battle game is cleared. Furthermore, in the challenge battle, it becomes possible to battle against a special enemy character when prescribed battle games are cleared. That is, an opening condition that has been set for battling against the special enemy character (special battle game) is to clear the prescribed battle games.

Furthermore, in the challenge battle, except when battling against the special enemy character (in an ordinary battle game), the battle games of the day can be played until the life points of all ally characters owned by a player become zero, without consuming the stamina of the player. In the challenge battle, when the life points of an ally character becomes zero in a battle game, the ally character whose life points have become zero becomes unselectable. Furthermore, in the challenge battle, when the player loses a battle game (when the life points of all of ally characters in a party become zero), the next battle game is started in a state in which enemy characters whose life points have already become zero are hidden.

Furthermore, in a special battle game, a player selects three parties for the battle game. Then, the player wins (clears) the battle game by causing the life points of all enemy characters to become zero before the life points of all ally characters in the three parties become zero.

When a battle game in the challenge battle is terminated, game result information is displayed on the display 26 similarly to the result screen for the main quest. Furthermore, it is also possible to display the report screen.

Figure 9B:
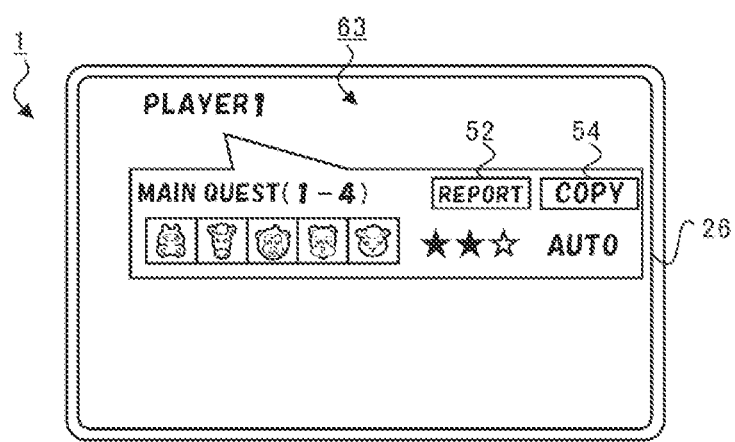
FIG. 9B is an illustration for explaining an example of the guild screen in which game result information for a main quest is displayed.
Figure 9C:
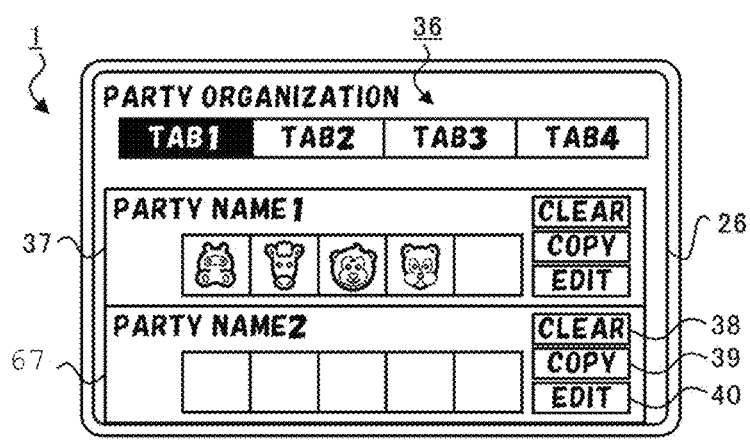
FIG. 9C is an illustration for explaining an example of the party organization screen in the case where no ally characters are owned.
Figure 10A:
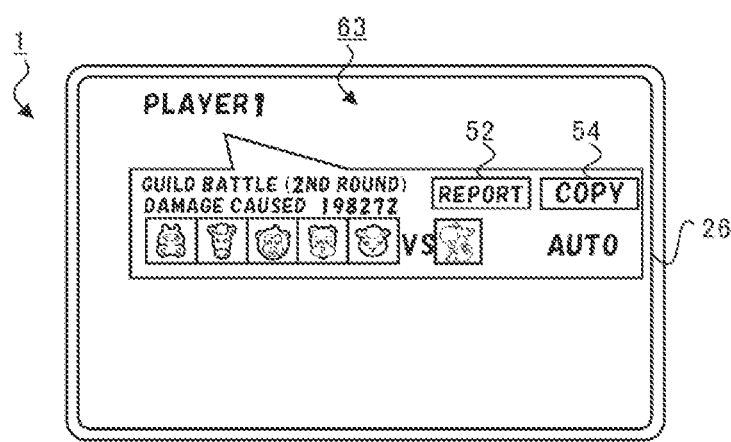
FIG. 10A is an illustration for explaining an example of the guild screen in which game result information for a guild battle is displayed.
Figure 10B:
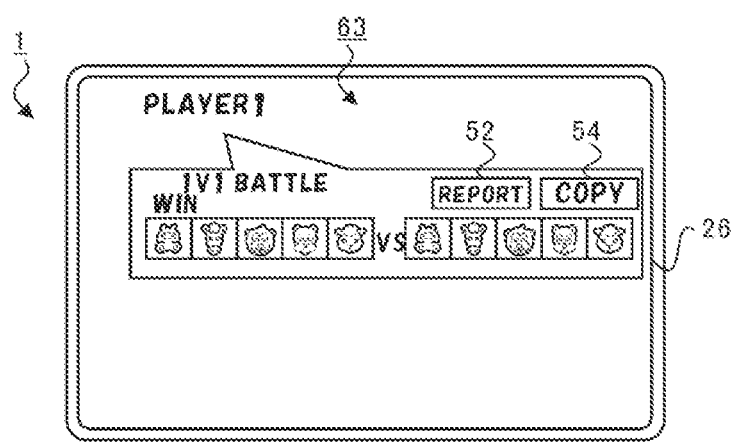
FIG. 10B is an illustration for explaining an example of the guild screen in which game result information for a 1V1 battle is displayed.
Figure 10C:
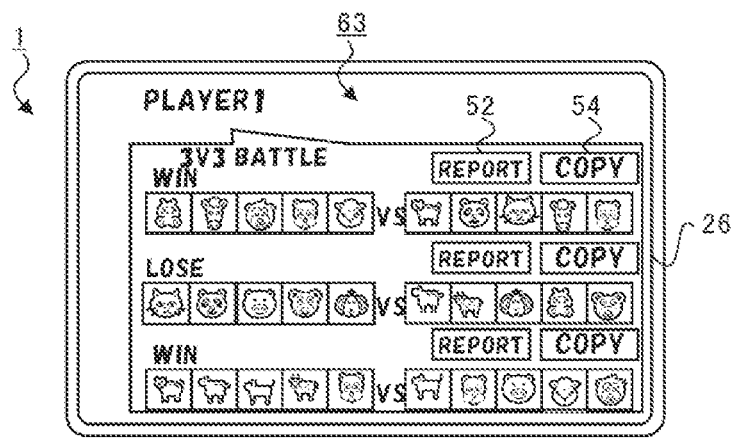
FIG. 10C is an illustration for explaining an example of the guild screen in which game result information for a 3V3 battle is displayed.
Figure 11A:
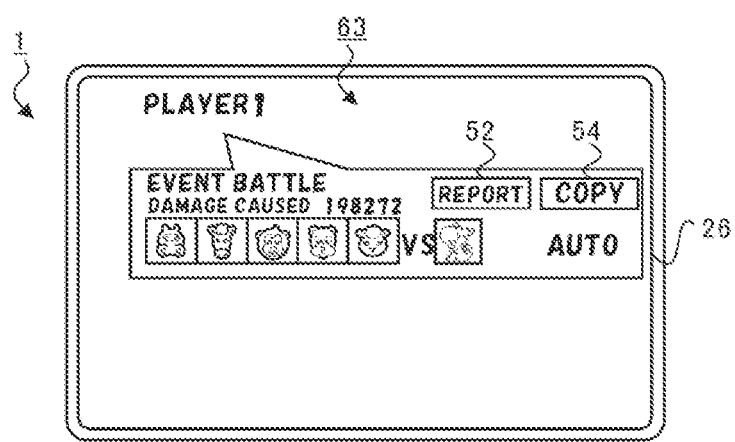
FIG. 11A is an illustration for explaining an example of the guild screen in which game result information for an event battle is displayed.
Figure 11B:
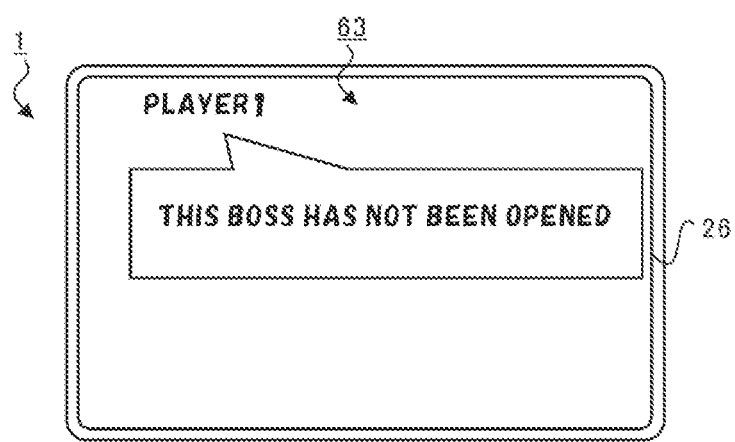
FIG. 11B is an illustration for explaining an example of the guild screen in which game result information indicating an unopened state is displayed.
Figure 11C:
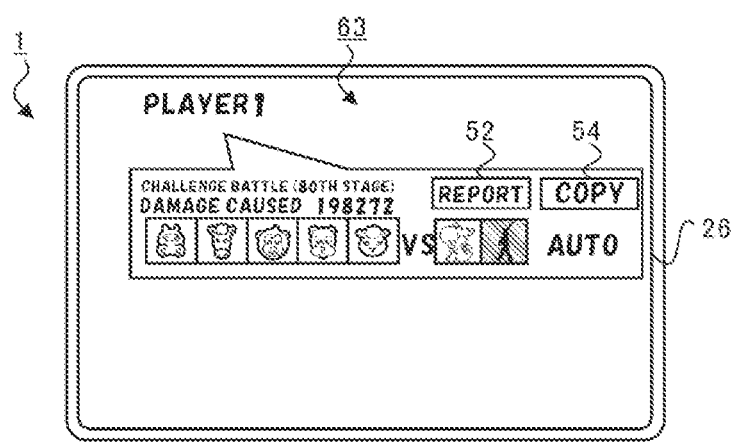
FIG. 11C is an illustration for explaining an example of the guild screen in which game result information for an ordinary battle game in a challenge battle is displayed.
Figure 12:
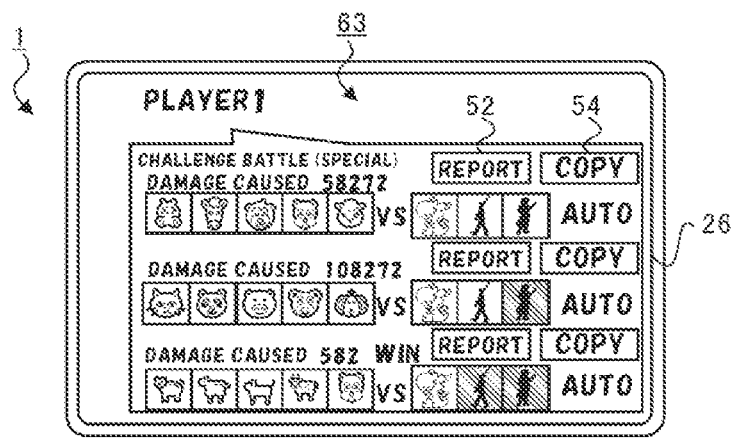
FIG. 12 is an illustration for explaining an example of the guild screen in which game result information for a special battle game in the challenge battle is displayed.

FIG. 9A is an illustration for explaining an example of the guild screen. FIG. 9B is an illustration for explaining an example of the guild screen in which game result information for the main quest is displayed. FIG. 9C is an illustration for explaining an example of the party organization screen in the case where no ally characters are owned. FIG. 10A is an illustration for explaining an example of the guild screen in which game result information for the guild battle is displayed. FIG. 10B is an illustration for explaining an example of the guild screen in which game result information for the 1V1 battle is displayed. FIG. 10C is an illustration for explaining an example of the guild screen in which game result information for the 3V3 battle is displayed. FIG. 11A is an illustration for explaining an example of the guild screen in which game result information for the event battle is displayed. FIG. 11B is an illustration for explaining an example of the guild screen in which game result information indicating an unopened state is displayed. FIG. 11C is an illustration for explaining an example of the guild screen in which game result information for an ordinary battle game in the challenge battle is displayed. FIG. 12 is an illustration for explaining an example of the guild screen in which game result information for a special battle game in the challenge battle is displayed.

As described above, in a game in this embodiment, it is possible for a guild to be configured by a plurality of players. For example, when a player creates a guild, the player ID of the player who has created the guild is saved in the server 100 in association with the group ID of the guild. Then, when another player performs an operation for participating in the guild, the group ID of the guild is saved in association with the player ID of the player who has performed the participation operation. Note that the players who configure the guild are referred to as guild members.

It is possible to share various kinds of information among guild members by using the guild screen shown in FIG. 9A. In a chat display area 63 displayed in the guild screen, the players can post text (text information) by performing an operation.

When a guild member belonging to the same guild displays the guild screen, the posted text is displayed on the display 26 of the player terminal 1 on which the guild screen has been displayed, together with the name of the player who posted the characters (player 1, player 2, etc.).

Furthermore, a player can post game result information for a battle game of the player to other player terminals 1. When a player posts game result information (transmits game result information from the player terminal 1), the posted game result information is saved in the server 100. Here, saving areas for individual group IDs are provided in the storage unit 118 of the server 100, and the posted game result information is saved in a saving area for a group ID including the player ID of the player who posted the game result information. Furthermore, in the saving areas for the individual group IDs, party saving areas for saving parties included in the game result information, i.e., the ally character IDs of ally characters constituting the parties are provided.

Furthermore, when another player displays the guild screen, the game result information saved in the saving area for the group ID of the group including the player ID of the other player is transmitted from the server 100 to the player terminal 1 of the player. Then, at the player terminal 1 of the other player, the transmitted game result information is saved in the storage unit 18 (shared information storage unit 83 (see FIG. 14)), and the game result information for a battle game is displayed in the chat display area 63. Note that the function for displaying game result information in the chat display area 63 is referred to as a shared information display function. When the post selection operation section 55 is operated in the report screen (log detail screen) shown in FIG. 6C, FIG. 7C, and FIG. 8B described above, the game result information displayed at that time on the display 26 is displayed (shared) in the chat display area 63.

When game result information for the main quest is posted, as shown in FIG. 9B, game kind information shown as "Main quest" indicating that this is the game result information for the main quest, a battle game stage (1-4), a party (ally characters), clear information (the number of stars), and whether the state is the auto state or the manual state ("Auto" here) are displayed.

Furthermore, the report display operation section 52 and the copy selection operation section 54 are displayed with these kinds of information. Then, when the report display operation section 52 is operated, the report screen as shown in FIG. 6C is displayed on the display 26. However, here, the copy selection operation section 54 and the post selection operation section 55 are hidden.

Furthermore, when the copy selection operation section 54 is operated, a party saving area for the party included in the game result information saved in the storage unit 18 (shared information storage unit 83 (see FIG. 14)) is set as a copy source, and the party organization screen shown in FIG. 4C is displayed on the display 26. Then, when a copy destination (party saving area of the player terminal 1) is selected, ally character IDs saved in the party saving area serving as a copy source are saved in the party saving area serving as a copy destination (party saving area of the player terminal 1). Furthermore, party information for the copied party is transmitted from the player terminal 1 to the server 100, and at the server 100, the ally character IDs are saved in a party saving area associated with the player ID of the player who has transmitted the party information. In this way, a guild member can register a party that cleared a battle game in a copy destination. Thus, since it is not necessary to ask for a party that cleared a battle game in the chat display area 63 and register replied ally characters manually, it is possible to easily create a party.

Here, there are cases where a player who copies a party does not own some or all of ally characters in a party at a copy source. In such a case, as shown in FIG. 9C, ally characters that are not owned by the player who copies a party are hidden, and only ally characters that are owned by the player who copies a party are registered as a party.

When game result information (my log) for the guild battle is posted, as shown in FIG. 10A, game kind information shown as "Guild battle" indicating that this is the game result for the guild battle, an enemy character, a battle game stage (indicating which round), a party (ally characters), damage points caused to the enemy character, and whether the state is the auto state or the manual state ("Auto" here) are displayed.

Also in the case where game result information for the guild battle is posted, the report display operation section 52 and the copy selection operation section 54 are displayed with the game result information.

When game result information for the 1V1 battle is posted, as shown in FIG. 10B, game kind information shown as "1V1 battle" indicating that this is the game result for the 1V1 battle, enemy characters, a party (ally characters), and winning or losing are displayed. Note that since the state of a battle game for the 1V1 battle is always the auto state, whether or not the state is the auto state or the manual state is not displayed.

Also in the case where game result information for the 1V1 battle is posted, the report display operation section 52 and the copy selection operation section 54 are displayed with the game result information.

When game result information for the 3V3 battle is posted, as shown in FIG. 10C, game kind information shown as "3V3 battle" indicating that this is the game result for the 3V3 battle, three parties of enemy characters, three parties (ally characters), and winning or losing in each battle game are displayed. Note that since the state of a battle game for the 3V3 battle is always the auto state, whether or not the state is the auto state or the manual state is not displayed.

In the case where game result information for the 3V3 battle is posted, for each party (battle game), the report display operation section 52 and the copy selection operation section 54 are displayed with the game result information.

When game result information for a battle game in the event battle (battle against a boss enemy character) is posted, as shown in FIG. 11A, game kind information shown as "Event battle" indicating that this is the game result for the event battle, an enemy character, a party (ally characters), damage points caused to the enemy character, and whether the state is the auto state or the manual state ("Auto" here) are displayed.

Also in the case where game result information for the event battle is posted, the report display operation section 52 and the copy selection operation section 54 are displayed with the game result information. However, in the case where a player who uses the player terminal 1 on which the game result information for the event battle is displayed has not opened a battle game for battling against a boss enemy character in the event battle, as shown in FIG. 11B, a message such as "This boss has not been opened" is displayed instead of the game result information. This prevents the boss enemy character from being shown to the player before the battle.

When game result information for an ordinary battle game in the challenge battle is posted, as shown in FIG. 11C, game kind information shown as "Challenge battle" indicating that this is the game result for the challenge battle, a battle game stage (80th stage here), enemy characters, a party (ally characters), damage points caused to the enemy characters, and whether the state is the auto state or the manual state ("Auto" here) are displayed.

In the case where game result information for an ordinary battle game in the challenge battle is displayed, there are cases where the life points of some of the enemy characters are zero (these enemy characters are not participating in the battle) when the ordinary battle game is started. In such a case, as indicated by hatching in FIG. 11C, an enemy character who has lost the battle (who is not participating in the battle) is hidden.

In addition, also in the case where game result information for an ordinary battle game is posted, the report display operation section 52 and the copy selection operation section 54 are displayed with the game result information.

When game result information for a special battle game in the challenge battle is posted, as shown in FIG. 12, game kind information shown as "Challenge battle (special)" indicating that this is the game result for the special battle game, parties of enemy characters, three parties (ally characters), damage points caused to the enemy characters, final winning or losing, and whether the state is the auto state or the manual state ("Auto" here) are displayed.

In the case where game result information for a special battle game in the challenge battle is displayed, there are cases where some of the enemy characters have lost the battle (these enemy characters are not participating in the battle) when the special battle game for each party is started. In such a case, as indicated by hatching in FIG. 12, enemy characters who have lost the battle (who are not participating in the battle) are hidden.

In the case where game result information for the special battle game is posted, for each party (battle game), the report display operation section 52 and the copy selection operation section 54 are displayed with the game result information.

As described above, when game result information is posted, the display mode of the game result information (displayed information) displayed in the chat display area 63 is varied on the basis of game kind information included in the game result information. Here, among various kinds of information included in the game result information, the kinds of information that are considered to be necessary for a player are displayed in the chat display area 63. This makes it possible for each player to copy a party on the basis of the information displayed in the chat display area 63.

Next, the communication processing of the player terminal 1 and the server 100 for posting game result information and copying a party will be described. Note that what will be described here are basic communication processing for the progress of a game and an example of main communication processing related to posting game result information and copying a party, and descriptions about other kinds of processing will be omitted.

(Communication Processing of the Player Terminal 1 and the Server 100)

Figure 13:
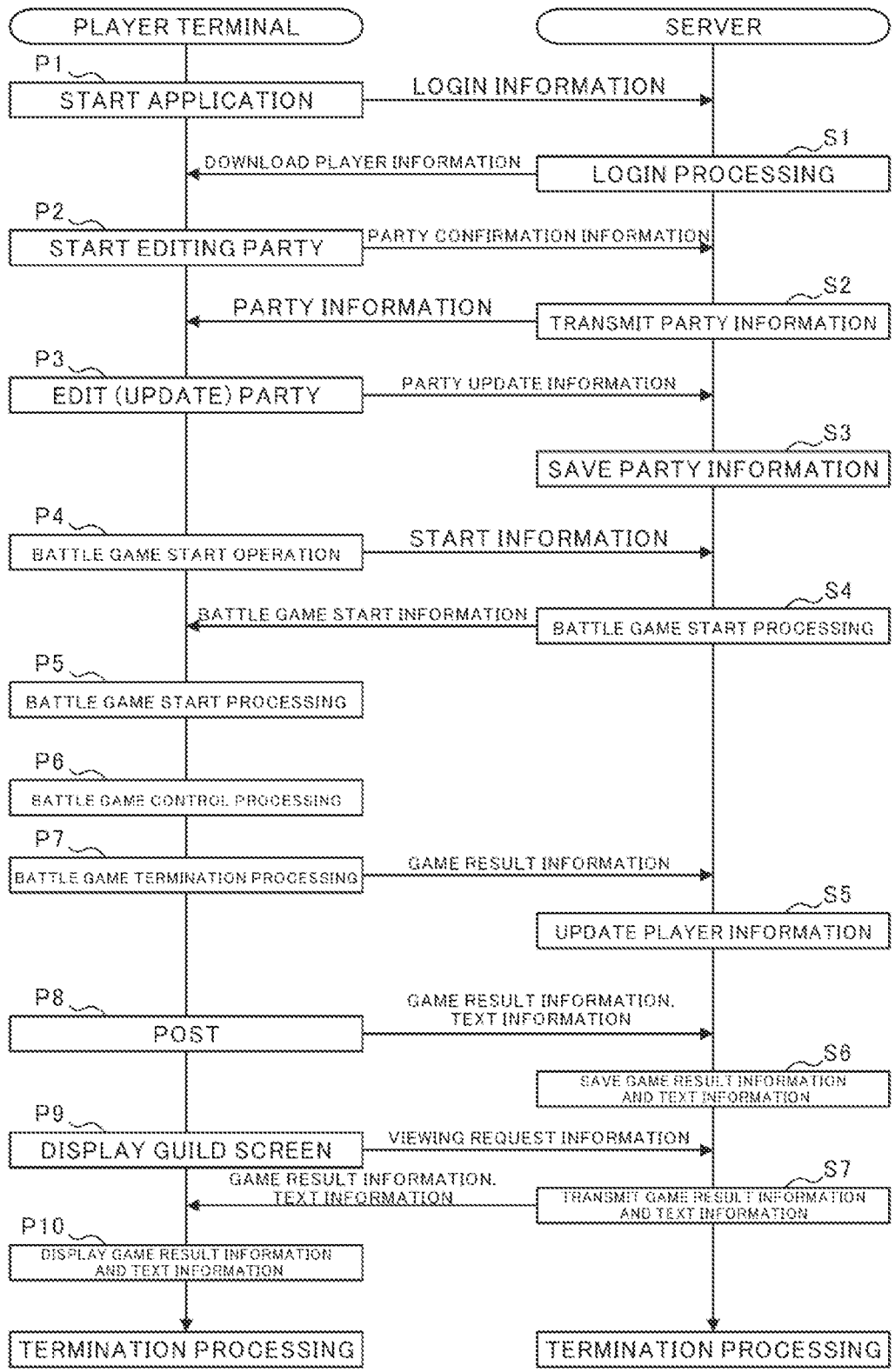
FIG. 13 is a sequence diagram for explaining the basic processing of the player terminal and the server.

FIG. 13 is a sequence diagram for explaining the basic processing of the player terminal 1 and the server 100. Note that in the following descriptions, processing at the player terminal 1 is indicated as Pn (n is an arbitrary integer). Furthermore, processing at the server 100 is indicated as Sn (n is an arbitrary integer). When a player starts a game application at the player terminal 1 (P1), login information is transmitted from the player terminal 1 to the server 100. Upon receiving the login information, the server 100 identifies a player ID associated with the login information and executes login processing (S1). Here, the server 100 allows the player terminal 1 to download player information corresponding to the identified player ID from the storage unit 118. The player information includes a plurality of ally character IDs associated with the player ID, game opening information indicating whether or not each kind of battle game has been opened, the level of the player, the stamina of the player, and party information indicating a party.

Furthermore, when the organization (creation) of a party is started in response to the display of the party selection screen shown in FIG. 5C or the operation of the copy selection operation section 54, the player terminal 1 transmits party confirmation information for confirming party information (P2). Upon receiving the party confirmation information, the server 100 transmits party information associated with the player ID (S2). At the player terminal 1, it becomes possible to organize a party when the party information is received, and when a party is organized (updated), party update information indicating the updated party is transmitted to the server 100 (P3). Upon receiving the party update information, the server 100 stores the party update information in the storage unit (party saving area) 118 in association with the player ID (S3).

Furthermore, it is assumed that an operation for starting a battle game is performed at the player terminal 1 (P4). In this case, start information is transmitted from the player terminal 1 to the server 100. Note that this start information includes information related to a party selected by the player, battle game kind information, etc. When the start information is input, the server 100 transmits battle game start information needed for starting a battle game to the player terminal 1 (S4). Furthermore, upon receiving the battle game start information, the player terminal 1 executes battle game start processing for starting a battle game (P5). Here, for example, the player terminal 1 secures an area in the memory 12 for the progress of the battle game, and reads a prescribed program from the storage unit 18 into the memory 12.

Then, the player terminal 1 executes battle game control processing for controlling a battle game (P6). In this battle game control processing, update processing for updating various kinds of information is executed repeatedly on a frame basis. Note that the number of frames is not particularly limited and the number of frames in one second is, for example, 30-60. Thus, in a battle game, the player terminal 1 updates information at intervals of about 16 ms (milliseconds) to 33 ms.

Then, when a battle game termination condition is satisfied, the player terminal 1 executes battle game termination processing for terminating the battle game (P7). In the battle game termination processing, for example, the result screen is displayed on the display 26, and game result information is transmitted to the server 100. Upon obtaining the game result information, the server 100 updates the player information (S5).

Furthermore, game result information or text information directed to guild members is posted at the player terminal 1 (P8), the server 100 stores the posted game result information or text information in the storage unit (party saving area) 118 (S6). Note that the game result information or the text information is stored in association with the group ID of a guild in which the player ID of the player who transmitted the information is included. Furthermore, when the guild screen is displayed on the display 26, the player terminal 1 transmits viewing request information for receiving the game result information or the text information to be displayed in the guild screen (P9). Upon receiving the viewing request information, the server 100 transmits the game result information or the text information stored in association with the group ID of a guild in which the player ID of the player who transmitted the viewing request information is included (S7). Then, at the player terminal 1, the transmitted game result information or text information is displayed on the display 26 (S10).

(Functional Configuration of the Player Terminal 1)

Figure 14:
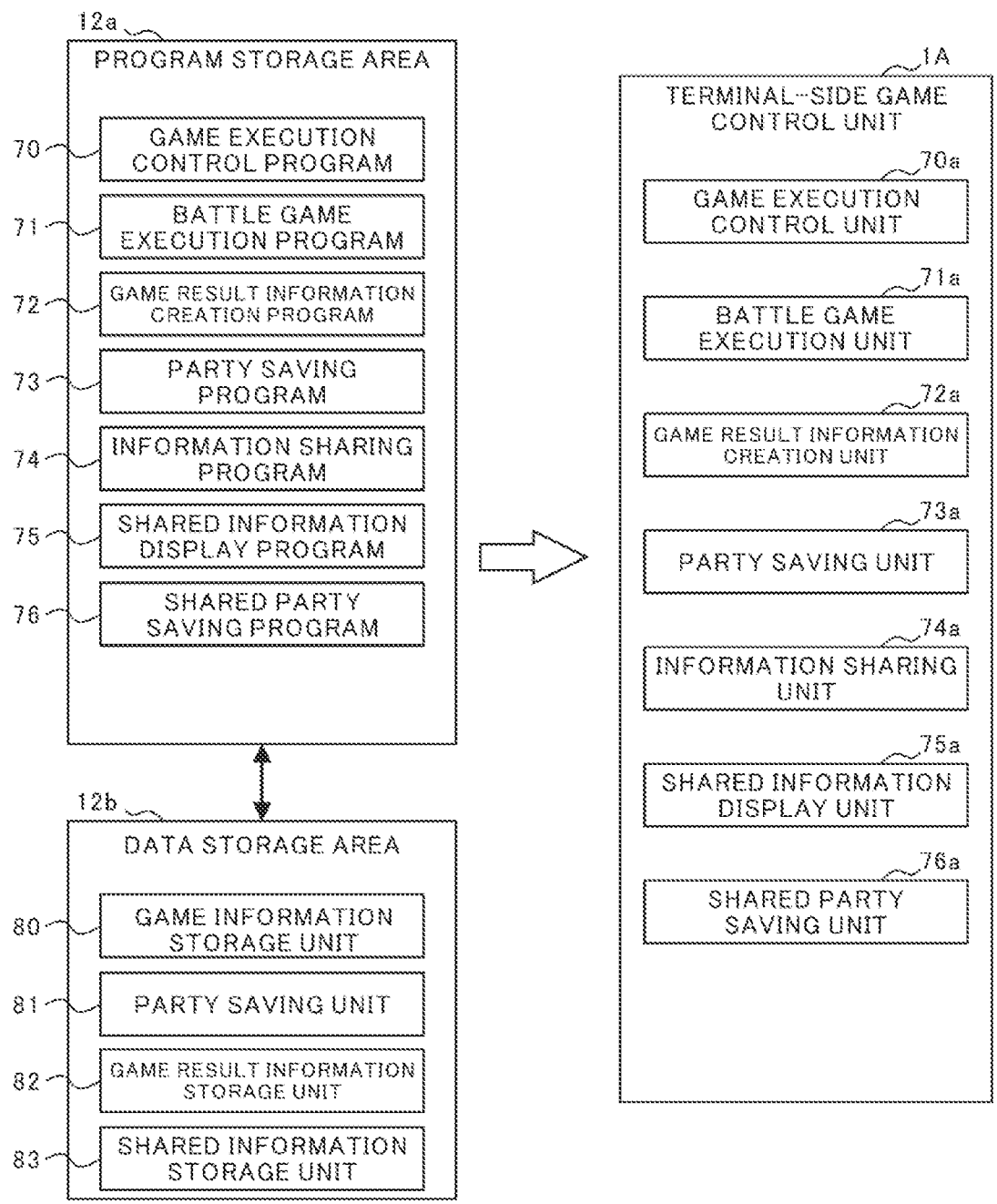
FIG. 14 is a diagram for explaining the configuration of the memory of the player terminal and the functions of the player terminal in the form of a computer.

FIG. 14 is a diagram for explaining the configuration of the memory 12 of the player terminal 1 and the functions of the player terminal 1 in the form of a computer. The memory 12 is provided with a program storage area 12a and a data storage area 12b. When a game is started, the CPU 10 stores terminal-side game control programs (modules) in the program storage area 12a.

The terminal-side game control programs include a game execution control program 70, a battle game execution program 71, a game result information creation program 72, a party saving program 73, an information sharing program 74, a sharing information display program 75, and a shared party saving program 76. Note that programs listed in FIG. 14 are just examples, and many other programs are provided as the terminal-side game control programs.

As storage units that store data, the data storage area 12b is provided with the game information storage unit 80, the party storage unit 81, a game result information storage unit 82, and the shared information storage unit 83. Note that the storage units described above are just examples, and the data storage area 12b is provided with many other storage units.

The CPU 10 runs each program stored in the program storage area 12a and updates data in each storage unit in the data storage area 12b. Furthermore, the CPU 10 causes the player terminal 1 (computer) to function as a terminal-side game control unit 1A by running each program stored in the program storage area 12a. The terminal-side game control unit 1A includes a game execution control unit 70a, a battle game execution unit 71a, a game result information creation unit 72a, a party saving unit 73a, an information sharing unit 74a, a shared information display unit 75a, and a shared party saving unit 76a.

Specifically, the CPU 10 runs the game execution control program 70 to cause the computer to function as the game execution control unit 70a. Similarly, the CPU 10 runs the battle game execution program 71, the game result information creation program 72, the party saving program 73, the information sharing program 74, the shared information display program 75, and the shared party saving program 76 to cause the computer to function as the battle game execution unit 71a, the game result information creation unit 72a, the party saving unit 73a, the information sharing unit 74a, the shared information display unit 75a, and the shared party saving unit 76a.

The game execution control unit 70a controls the progress of a game as a whole. For example, the game execution control unit 70a displays the home screen on the display 26 in accordance with an operation on the player terminal 1. Furthermore, the game execution control unit 70a updates information in the game information storage unit 80 in the case where game-related information (game information) is updated.

The battle game execution unit 71a is in charge of controlling the execution of a battle game. For example, the battle game execution unit 71a, on the basis of an operation input to the player terminal 1, updates the battle screen, controls the actions of an ally character and an enemy character, or derives damage points.

When a battle game is terminated, the game result information creation unit 72a creates game result information for the terminated battle game. Furthermore, in the case where the game result information is stored as a my log, the game result information creation unit 72a stores the game result information in the game result information storage unit 82 as a my log.

The party saving unit 73a, on the basis of an operation input to the player terminal 1, performs party organization other than party organization based on shared game result information (party organization by using the screens shown in FIG. 4A to FIG. 4C). Furthermore, the party saving unit 73a stores changed party information in the party storage unit 81, or transmits changed party information to the server 100.

The information sharing unit 74a controls the posting and reception of game result information or text information among guild members. Specifically, in the case where the post selection operation section 55 is operated in the screen shown in FIG. 6C, FIG. 7C, or FIG. 8B, the information sharing unit 74a transmits, to the server 100, game result information created when a battle game is terminated, or game result information saved in the game result information storage unit 82. Furthermore, the information sharing unit 74a stores the game result information or text information received from the server 100 in the shared information storage unit 83.

The shared information display unit 75a executes a shared information display function for displaying the game result information or text information received by the information sharing unit 74a in the chat display area 63.

The shared party saving unit 76a stores a party included in the game result information displayed by the shared information display function in the party storage unit 81.

(Specific Processing of the Player Terminal 1)

Figure 15:
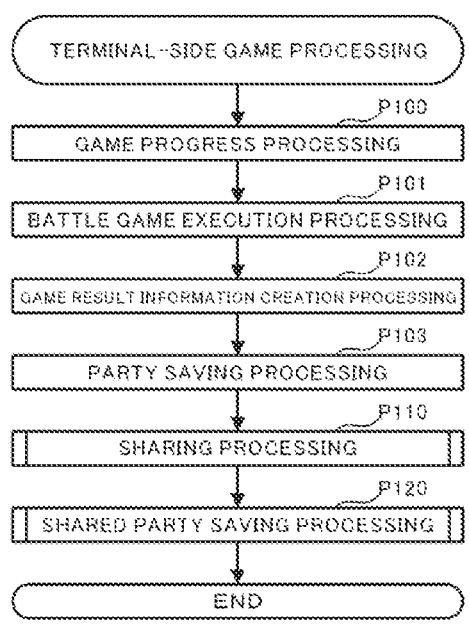
FIG. 15 is a flowchart for explaining an example of terminal-side game processing at the player terminal.

FIG. 15 is a flowchart for explaining an example of terminal-side game processing at the player terminal 1. In the terminal-side game processing, the game execution control unit 70a executes game progress processing (P100). Furthermore, the battle game execution unit 71a executes control for executing a battle game (P101). The game result information creation unit 72a creates, when a battle game is terminated, game result information for the terminated battle game (P102). The party saving unit 73a, on the basis of an operation input to the player terminal 1, performs party organization other than party organization based on shared game result information, and saves the organized party (P103). Furthermore, the information sharing unit 74a and the shared information display unit 75a execute sharing processing for sharing game result information or text information among guild members (P110). Furthermore, the shared party saving unit 76a executes shared party saving processing for storing a party included in the game result information displayed by the shared information display function in the party storage unit (party saving area) 81 (P120).

Figure 16:
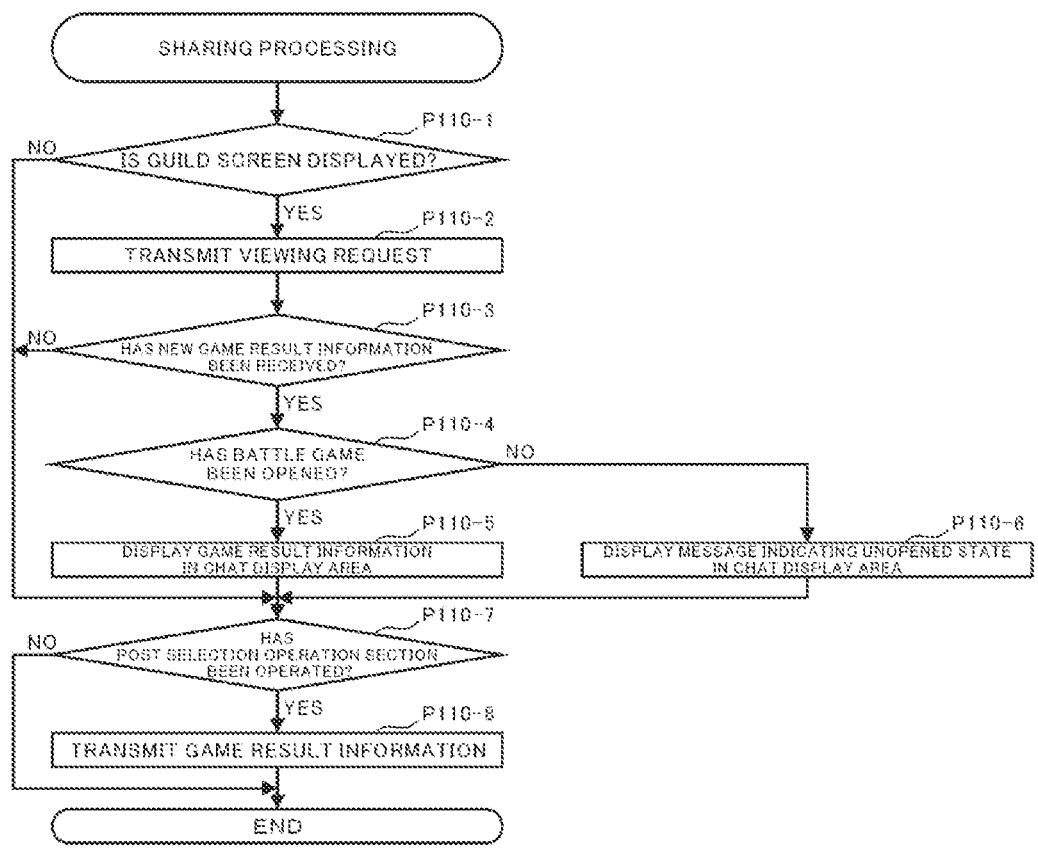
FIG. 16 is a flowchart for explaining an example of sharing processing at the player terminal.

FIG. 16 is a flowchart for explaining an example of sharing processing at the player terminal 1. Here, sharing of game result information will be described. In the case where the guild screen is displayed on the display 26 (YES in P110-1), the information sharing unit 74a transmits viewing request information to the server 100 (P110-2). Upon receiving the viewing request information, in the case where new game result information is stored in the storage unit 118, the server 100 transmits the game result information to the player terminal 1, and simultaneously transmits player information associated with a player ID.

In the case where the new game result information is received (YES in P110-3), the shared information display unit 75a stores the player information in the game information storage unit 80, and stores the new game result information in the shared information storage unit 83. Furthermore, the shared information display unit 75a determines whether the battle game included in the game result information has been opened on the basis of the received game result information and player information (game opening information). Then, if the battle game included in the game result information has been opened (YES in P110-4), the shared information display unit 75a extracts information to be displayed (determines a display mode) on the basis of game kind information included in the received game result information, and executes the shared information display function for displaying the extracted information in the chat display area 63, as shown in FIG. 9B, FIG. 9C, FIG. 10A to FIG. 10C, FIG. 11A, FIG. 11C, and FIG. 12 (P110-5). Meanwhile, if the battle game included in the game result information is in an unopened state (NO in P110-4), the shared information display unit 75a displays a message such as "This boss has not been opened", as shown in FIG. 11B, instead of the game result information (P110-6).

Furthermore, in the case where the post selection operation section 55 is operated in the screen shown in FIG. 6C, FIG. 7C, or FIG. 8B (YES in P110-7), the information sharing unit 74a transmits the game result information displayed in the screen to the server 100 (P110-8). The server 100 saves the transmitted game result information in a saving area for a group ID including the player ID of the player who transmitted the game result information. Thus, in the sharing processing, the information sharing unit 74a shares the game result information among two or more players, and the shared information display unit 75a executes the shared information display function for displaying the shared game result information.

Figure 17:
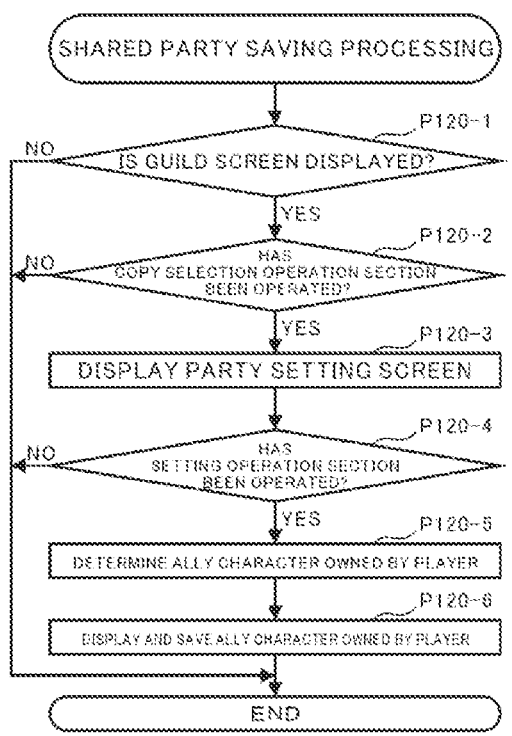
FIG. 17 is a flowchart for explaining an example of shared party saving processing at the player terminal.

FIG. 17 is a flowchart for explaining an example of shared party saving processing at the player terminal 1. In the case where the guild screen is displayed on the display 26 (YES in P120-1), the shared party saving unit 76a determines whether the copy selection operation section 54 in the game result information displayed in the chat display area 63 has been operated (P120-2). Then, in the case where the copy selection operation section 54 has been operated (YES in P120-2), the shared party saving unit 76a displays the party setting screen shown in FIG. 4C on the display 26 (P120-3). Furthermore, when the setting operation section 43 in one of the party display areas 37, 67 is operated in the party setting screen (YES in P120-4), the shared party saving unit 76a, on the basis of player information and ally characters in a party included in the selected game result information, determines whether a player owns the ally characters in the party included in the game result information (P120-5). Here, the determination is made on the basis of whether ally character IDs in the party included in the selected game result information are associated with ally character IDs associated with a player ID, which are based on the player information.

Then, the shared party saving unit 76a displays, in the first party display area 37, only ally characters owned by the player among ally characters (ally character IDs) included in the game result information, and saves only ally character IDs associated with the player ID in the party storage unit 81 as a party (P120-6). This prevents ally character IDs not associated with the player ID from being saved.

Second Embodiment

The information processing system S in the second embodiment has the same configuration as that of the information processing system S in the first embodiment. Furthermore, the information processing system S in the second embodiment is provided with various kinds of functions that can be executed by the information processing system S in the first embodiment, and is also provided with a function for making it possible to easily select a party to be used in a battle game and easily start the battle game.

Figure 18A:
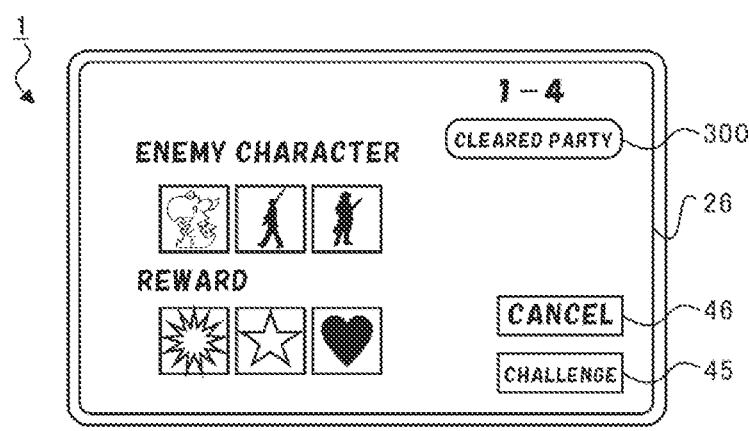
FIG. 18A is an illustration for explaining an example of the main quest selection screen in a second embodiment.
Figure 18B:
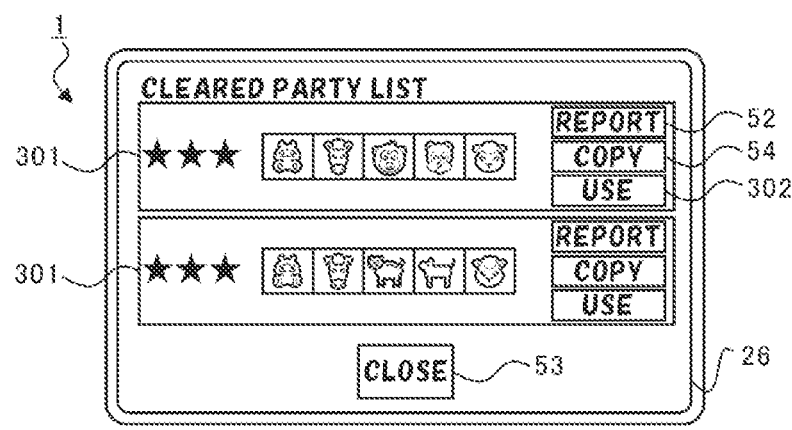
FIG. 18B is an illustration for explaining an example of a cleared party list screen.
Figure 19A:
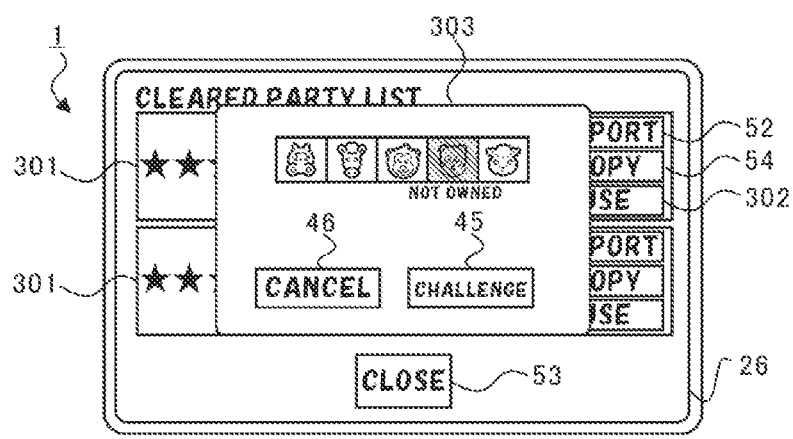
FIG. 19A is an illustration for explaining an example of a party dialog.
Figure 19B:
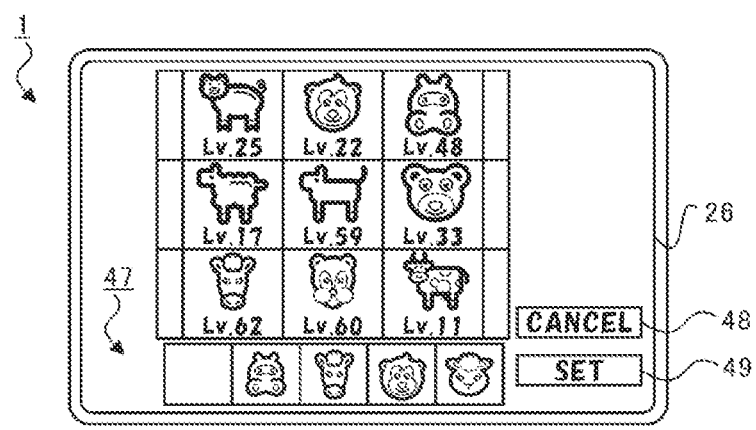
FIG. 19B is an illustration for explaining an example of the party selection screen.

FIG. 18A is an illustration for explaining an example of the main quest selection screen in the second embodiment. FIG. 18B is an illustration for explaining an example of a cleared party list screen. FIG. 19A is an illustration for explaining an example of a party dialog. FIG. 19B is an illustration for explaining an example of the party selection screen.

In the second embodiment, at the player terminal 1, when the main quest selection operation section 44 for the "1-4" battle game is operated (tapped) in a state in which the main quest screen (see FIG. 5A) is displayed, the main quest selection screen shown in FIG. 18A is displayed on the display 26. Compared with the main quest selection screen shown in FIG. 5B, a cleared party selection operation section 300, shown as "Cleared party", for displaying parties with which other players cleared the battle game (hereinafter referred to as cleared parties) is additionally displayed in the main quest selection screen shown in FIG. 18A.

Furthermore, when the cleared party selection operation section 300 is operated (tapped), the player terminal 1 transmits cleared party request information for requesting cleared party information for a displayed battle game stage ("1-4" here) to the server 100. In response to the cleared party request information, the server 100 transmits a plurality of items (e.g., 10 items) of cleared party information to the player terminal 1. The cleared party information is managed in association with information indicating a battle game stage included in game result information. On the basis of game result information for other players who cleared the battle game stage indicated in the cleared party request information, the server 100 generates cleared party information including part of the game result information. For example, the cleared party information includes, among the game result information, the ally character IDs of ally characters (party), the enemy character IDs of enemy characters, the surviving situation of the ally characters and the enemy characters when the battle was terminated (whether or not life points were zero when the battle game was terminated), damage points caused (total value), and information associated with each kind of battle game (such as clear information) when the battle game stage "1-4" was cleared by the other players. Note that the cleared party information may be generated at the player terminal 1 that has received the game result information from the server 100.

Upon receiving the cleared party information, the player terminal 1 displays the cleared party list screen shown in FIG. 18B on the display 26. A plurality of cleared party display areas 301 are displayed in the cleared party list screen. In each cleared party display area 301, a cleared party is displayed with clear information (stars). Furthermore, in the cleared party display area 301, the report display operation section 52, the copy selection operation section 54, and a usage selection operation section 302, shown as "Use", for using the cleared party in a battle game are displayed.

Then, when the usage selection operation section 302 is operated (tapped), as shown in FIG. 19A, a party dialog 303 is displayed in front of the cleared party list screen. In the party dialog 303, the cleared party in the cleared party display area 301, which has been selected by means of the usage selection operation section 302, is displayed, and the challenge selection operation section 45 and the cancellation selection operation section 46 are displayed. Here, in the party dialog 303, ally characters owned by a player are displayed, an ally character not owned by the player (second ally character from the right in the drawing) is displayed in a different display mode (e.g., displayed in a dark color) from the ally characters owned by the player, and characters such as "Not owned" are displayed near said ally character. This makes it possible for the player to easily recognize an ally character not owned by the player.

Then, when the challenge selection operation section 45 is operated (tapped), the party selection screen shown in FIG. 19B is displayed. In this party selection screen, among ally characters displayed in the party dialog 303, ally characters owned by the player are displayed in the selected ally character display area 47. Then, when the setting operation section 49 is operated (tapped), the battle screen shown in FIG. 6A is displayed on the display 26, and the "1-4" battle game for the main quest is started. In the case where stamina for executing the main quest is insufficient, it is not possible to operate (tap) the challenge selection operation section 45. Furthermore, when the cancellation selection operation section 46 is operated (tapped), the cleared party list screen shown in FIG. 18B is displayed on the display 26.

As described above, at the player terminal 1, by a player selecting one of cleared parties with which other players cleared a battle game, the selected cleared party (ally character IDs) is copied in the selected ally character display area 47, and it becomes possible to start a battle game by operating the challenge selection operation section 45 displayed in the same screen. This makes it possible for a player to easily start a battle game by using one of cleared parties (ally character IDs) with which other players cleared a battle game, thereby reducing the work involved in changing the organization of a party and testing if it is possible to clear the battle game.

Figure 20A:
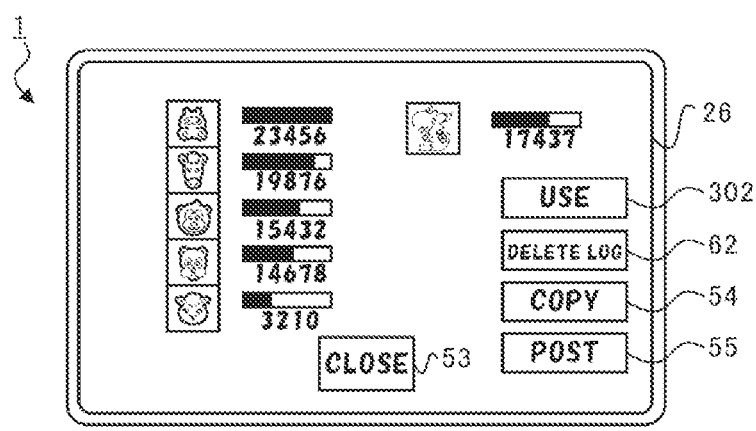
FIG. 20A is an illustration for explaining an example of the log detail screen in the second embodiment.
Figure 20B:
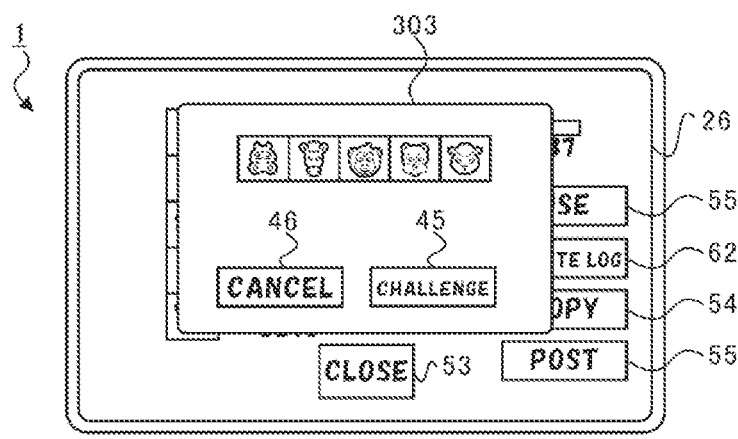
FIG. 20B is an illustration for explaining an example of the party dialog.
Figure 21A:
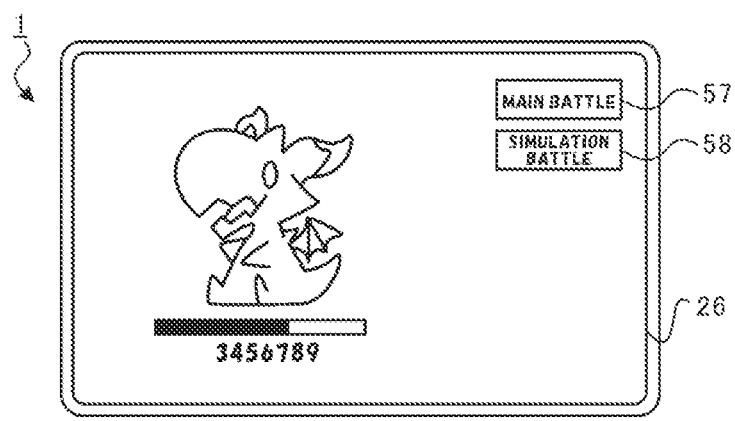
FIG. 21A is an illustration for explaining an example of the guild quest selection screen.
Figure 21B:
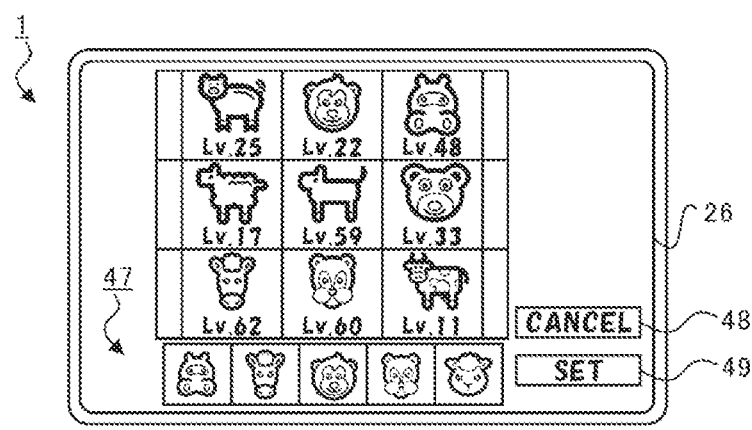
FIG. 21B is an illustration for explaining an example of the party selection screen.

FIG. 20A is an illustration for explaining an example of the log detail screen in the second embodiment. FIG. 20B is an illustration for explaining an example of the party dialog. FIG. 21A is an illustration for explaining an example of the guild quest selection screen. FIG. 21B is an illustration for explaining an example of the party selection screen.

In the second embodiment, at the player terminal 1, in a state in which the my log display screen (see FIG. 8A) is displayed on the display 26, when the my log display area 61 displayed at that time is operated (tapped), the log detail screen shown in FIG. 20A is displayed on the display 26. Compared with the log detail screen shown in FIG. 8B, the usage selection operation section 302 is added to the log detail screen in the second embodiment.

Then, when the usage selection operation section 302 is operated (tapped), as shown in FIG. 20B, the party dialog 303 is displayed in front of the log detail screen. In the party dialog 303, the party displayed in the log detail screen is displayed, and the challenge selection operation section 45 and the cancellation selection operation section 46 are displayed. Note that since the function for displaying a my log is a function for displaying the result of a battle game played by a player in the guild battle, there are no cases where ally characters not owned by the player are displayed.

Then, when the challenge selection operation section 45 is operated (tapped), as shown in FIG. 21A, the guild quest selection screen showing a selectable enemy character is displayed on the display 26. During a period in which the guild battle is not held or in the case where the maximum executable number of times per day has been exceeded, it is not possible to operate (tap) the challenge selection operation section 45.

Then, when either the main battle selection operation section 57 or the simulation battle selection operation section 58 is operated (tapped), the party selection screen shown in FIG. 21B is displayed on the display 26. In this party selection screen, ally characters displayed in the party dialog 303 are displayed in the selected ally character display area 47. Then, when the setting operation section 49 is operated (tapped), the battle screen is displayed on the display 26, and a battle game in the guild battle is started.

As described above, at the player terminal 1, by selecting one of the parties displayed in the my log detail screen, the selected party is copied to the selected ally character display area 47, and it becomes possible to start a battle game in the guild battle. This makes it possible for a player to easily start a battle game in the guild battle by using a party displayed in the my log detail screen.

Figure 22:
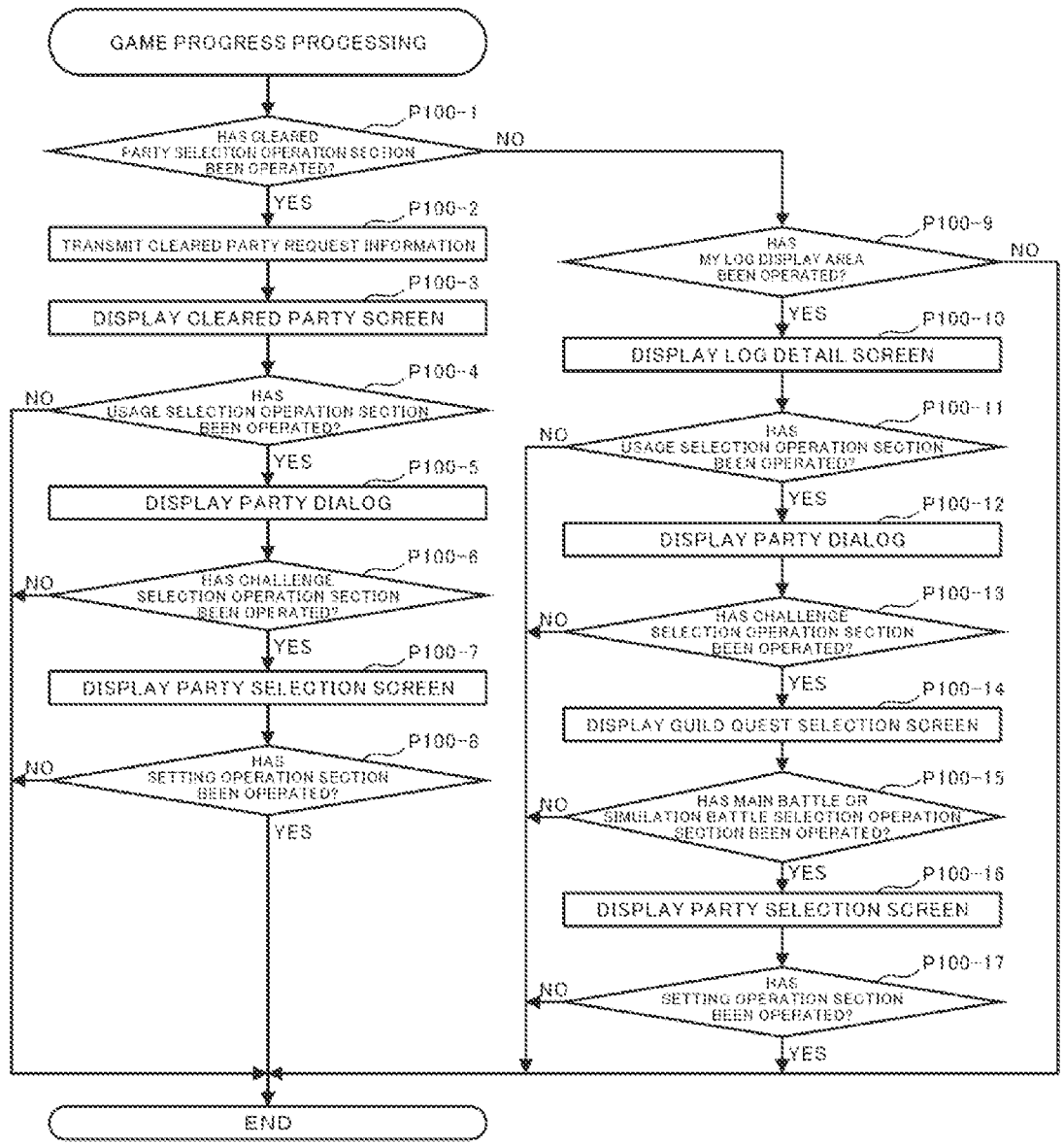
FIG. 22 is a flowchart for explaining an example of game progress processing in the second embodiment.

FIG. 22 is a flowchart for explaining an example of game progress processing P100 in the second embodiment. Note that, here, the processing in the case where the usage selection operation section 302 is operated will be mainly described, and the descriptions about other kinds of processing will be omitted.

When the game progress processing P100 in the terminal-side game processing shown in FIG. 15 is executed, as shown in FIG. 22, the game execution control unit 70a determines whether the cleared party selection operation section 300 displayed in the main quest selection screen has been operated (tapped) (P100-1). Then, in the case where the cleared party selection operation section 300 has been operated (YES in P100-1), the game execution control unit 70a transmits cleared party request information for a displayed battle game stage to the server 100 (P100-2). Then, upon receiving cleared party information from the server 100, the game execution control unit 70a displays the cleared party list screen on the display 26 (P100-3).

Then, when the usage selection operation section 302 in one of the cleared party display areas 301 is operated (tapped) (YES in P100-4), the game execution control unit 70a displays the party dialog 303 corresponding to the selected cleared party display area 301 in front of the cleared party list image (P100-5). Then, when the challenge selection operation section 45 is operated (tapped) (YES in P100-6), the game execution control unit 70a displays the party selection screen shown in FIG. 19B on the display 26 (P100-7). Here, among the ally characters displayed in the party dialog 303, ally characters owned by a player are displayed in the selected ally character display area 47.

Then, when the setting operation section 49 is operated (tapped) (YES in P100-8), the processing is terminated, and the battle game execution unit 71a displays the battle screen on the display 26 and starts a battle game in the main quest (P101).

Furthermore, in a state in which the my log display screen (see FIG. 8A) is displayed on the display 26, when the my log display area 61 displayed at that time is operated (tapped) (P100-9), the game execution control unit 70a displays the log detail screen shown in FIG. 20A on the display 26 (P100-10). Then, when the usage selection operation section 302 is operated (tapped) (YES in P100-11), the game execution control unit 70a displays the party dialog 303 in front of the log detail screen (P100-12).

Then, when the challenge selection operation section 45 is operated (tapped) (YES in P100-13), the game execution control unit 70a displays the guild quest selection screen on the display 26 (P100-14), and then, when the main battle selection operation section 57 or the simulation battle selection operation section 58 is operated (tapped) (YES in P100-15), the game execution control unit 70a displays the party selection screen (P100-16). Here, ally characters displayed in the party dialog 303 are displayed in the selected ally character display area 47.

Then, when the setting operation section 49 is operated (tapped) (YES in P100-17), the processing is terminated, and the battle game execution unit 71a displays the battle screen on the display 26 and starts a battle game in the guild battle (P101).

As described above, in the player terminal 1, the game execution control program 70, the battle game execution program 71, the game result information creation program 72, the party saving program 73, the information sharing program 74, the shared information display program 75, and the shared party saving program 76 are provided. Furthermore, the player terminal 1 includes the game execution control unit 70a, the battle game execution unit 71a, the game result information creation unit 72a, the party saving unit 73a, the information sharing unit 74a, the shared information display unit 75a, and the shared party saving unit 76a. However, these programs and function units may be provided in the server 100.

Furthermore, the player terminal 1 may transmit information indicating an operation section operated by a player to the server 100, and the server 100 may proceed with a game, save a party, execute the sharing processing, etc. on the basis of these programs. Furthermore, the game information storage unit 80, the party storage unit 81, the game result information storage unit 82, and the shared information storage unit 83 may be provided only in the server 100.

Furthermore, in the embodiment described above, when the post selection operation section 55 is operated, i.e., in response to a player operation, game result information is shared. However, without being limited to this case, the player terminal 1 may automatically share game result information by means of computer control. That is, game result information may be shared in the case where a prescribed condition is satisfied.

Furthermore, in the embodiment described above, game result information is shared among guild members. However, game result information may be shared among various players, such as between two players or among all players.

Furthermore, in the embodiment described above, in the case where a battle against a boss enemy character has not been opened (in an unopened state) in the event battle, game result information is hidden and the screen shown in FIG. 11B is displayed. However, game result information corresponding to a battle game in an unopened state may be hidden in the main quest, the challenge battle, etc.

Furthermore, in the embodiment described above, a party saving area and the shared information storage unit 83 (saving area for each group ID) are provided in the player terminal 1 and the server 100. However, the party saving area and the shared information storage unit 83 may be provided only in the server 100. In this case, when the copy selection operation section 54 is operated, a party saving area in the server 100, in which ally character IDs of a party included in game result information subjected to a copy operation is saved, is set as a copy source. Furthermore, a party saving area in the server 100 corresponding to a party selected in the party organization screen is set as a copy destination, and ally character IDs are saved in the party saving area serving as a copy destination.

Furthermore, in the second embodiment described above, when the usage selection operation section 302 is operated (tapped), the party dialog 303 is displayed on the display 26. However, the party dialog 303 need not necessarily be displayed. For example, when making settings about a game in the menu screen, whether or not the party dialog 303 is displayed may be set in accordance with a selection made by a player.

Although embodiments have been described above with reference to the drawings, it goes without saying that the present invention is not limited to the embodiments described above. It is obvious that a person skilled in the art could conceive of various kinds of modifications or corrections within the range recited in the claims, and it is understood that these modifications or corrections naturally belong to the technical scope of the present invention.

What is claimed is:

1. A non-transitory computer readable medium storing a program causing a computer to perform a method comprising:
    displaying, using a display device on a first player terminal, an ally character confirmation screen comprising a plurality of ally character images corresponding to a first plurality of ally characters;
    receiving, based on a first player operation by a first player in response to displaying the ally character confirmation screen, an ally character selection of at least a portion of the first plurality of ally characters for organizing a first party, the ally character selection corresponding to a plurality of selected ally characters;
    saving among a plurality of character IDs associated with a player ID, a plurality of selected character IDs selected by the first player operation in a party saving area associated with the player ID, wherein the plurality of selected character IDs correspond to the plurality of selected ally characters, and wherein the party saving area is located in a storage unit in a server;
    executing a first battle game by using the plurality of selected character IDs stored in the party saving area, wherein the first battle game comprises at least one ally character among the plurality of selected ally characters attacking at least one enemy character;
    creating, in response to the first battle game being terminated, game result information comprising the plurality of selected character IDs of the plurality of selected ally characters that are used for executing the first battle game;
    transmitting, over a communication network, the game result information between the first player terminal of the first player and a second player terminal based on a second player operation by the first player;
    displaying the game result information of the first battle game on the second player terminal for a second player, wherein the game result information describes results of the plurality of selected ally characters during the first battle game of the first player;
    saving, based on a third player operation in a report screen on the second player terminal that comprises the game result information, the plurality of selected character IDs included in the game result information in the party saving area associated with the player ID of a player who has performed the third player operation;
    displaying, based on the plurality of selected character IDs that are saved in the party saving area, a first party display area on the display device for the first player and a second party display area on the display device for the second player,
        wherein the first party display area comprises the plurality of selected ally characters in the first party;
    performing, in response to a player input, a copy operation between the first party display area and the second party display area,
    wherein the first party display area is a copy source for a copied ally character among the plurality of selected ally characters and the second party display area is a copy destination for a second party comprising the copied ally character; and
    executing a second battle game on the second player terminal using the second party comprising the copied ally character.

2. The non-transitory computer readable medium according to claim 1, wherein saving the plurality of selected character IDs included in the game result information in the party saving area comprises:
    determining, based on the plurality of selected character IDs associated with the player ID, whether the plurality of selected character IDs included in the game result information is associated with the player ID; and
    saving the plurality of selected character IDs that are associated with the player ID in the party saving area, and not saving a character ID that is not associated with the player ID in the party saving area.

3. The non-transitory computer readable medium according to claim 2,
    wherein the game result information includes game kind information of a game kind of the first battle game, and
    wherein the program further causes the computer to execute determining a display mode of the game result information based on the game kind information.

4. The non-transitory computer readable medium according to claim 1,
    wherein the game result information includes game kind information of a game kind of the first battle game, and
    wherein the program further causes the computer to execute determining a display mode of the game result information based on the game kind information.

5. The non-transitory computer readable medium according to claim 1, wherein the method further comprises:
- transmitting, over the communication network, shared text information between the first player terminal and the second player terminal based on the second player operation by the first player;
- displaying the shared text information in a chat display area of a guild screen in response to the second player operation,
- wherein the shared text information is displayed with the player ID.

6. The non-transitory computer readable medium according to claim 1,
- wherein the game result information is saved by a server in association with a group ID,
- wherein the group ID comprises a plurality of player IDs and the player ID that are members of a guild.

7. The non-transitory computer readable medium according to claim 1,
- wherein the first battle game is a guild battle.

8. An information processing method comprising:
- displaying, using a display device on a first player terminal, an ally character confirmation screen comprising a plurality of ally character images corresponding to a first plurality of ally characters;
- receiving, based on a first player operation by a first player in response to displaying the ally character confirmation screen, an ally character selection of at least a portion of the first plurality of ally characters for organizing a first party, the ally character selection corresponding to a plurality of selected ally characters;
- saving, among a plurality of character IDs associated with a player ID, a plurality of selected character IDs selected by the first player operation in a party saving area associated with the player ID, wherein the plurality of selected character IDs correspond to the plurality of selected ally characters, and wherein the party saving area is located in a storage unit in a server;
- executing a first battle game by using the plurality of selected character IDs stored in the party saving area, wherein the first battle game comprises at least one ally character among the plurality of selected ally characters attacking at least one enemy character;
- creating, in response to the first battle game being terminated, game result information comprising the plurality of selected character IDs of the plurality of selected ally characters that are used for executing the first battle game;
- transmitting, over a communication network, the game result information between the first player terminal of the first player and a second player terminal based on a second player operation by the first player;
- displaying the game result information of the first battle game on the second player terminal for a second player, wherein the game result information describes results of the plurality of selected ally characters during the first battle game of the first player;
- saving, based on a third player operation in a report screen on the second player terminal that comprises the game result information, the plurality of selected character IDs included in the game result information in the party saving area associated with the player ID of a player who has performed the third player operation;
- displaying, based on the plurality of selected character IDs that are saved in party saving area, a first party display area on the display device for the first player and a second party display area on the second display device for the second player,
  - wherein the first party display area comprises the plurality of selected ally characters in the first party;
- performing, in response to a player input, a copy operation between the first party display area and the second party display area,
- wherein the first party display area is a copy source for a copied ally character among the plurality of selected ally characters and the second party display area is a copy destination for a second party comprising the copied ally character; and
- executing a second battle game on the second player terminal using the second party comprising the copied ally character.

9. A game device comprising a computer configured to perform a method comprising:
- displaying, using a display device on a first player terminal, an ally character confirmation screen comprising a plurality of ally character images corresponding to a first plurality of ally characters;
- receiving, based on a first player operation by a first player in response to displaying the ally character confirmation screen, an ally character selection of at least a portion of the first plurality of ally characters for organizing a first party, the ally character selection corresponding to a plurality of selected ally characters;
- saving, among a plurality of character IDs associated with a player ID, a plurality of selected character IDs selected by the first player operation in a party saving area associated with the player ID, wherein the plurality of selected character IDs correspond to the plurality of selected ally characters, wherein the party saving area is located in a storage unit in a server;
- executing a first battle game by using the plurality of selected character IDs stored in the party saving area, wherein the first battle game comprises at least one ally character among the plurality of selected ally characters attacking at least one enemy character;
- creating, in response to the first battle game being terminated, game result information comprising the plurality of selected character IDs of the plurality of selected ally characters that are used for executing the first battle game;
- transmitting, over a communication network, the game result information between the first player terminal of the first player and a second player terminal based on a second player operation by the first player;
- displaying the game result information of the first battle game on the second player terminal for a second player, wherein the game result information describes results of the plurality of selected ally characters during the first battle game of the first player; and
- saving, based on a third player operation in a report screen on the second player terminal that comprises the game result information, the plurality of selected character IDs included in the game result information in the party saving area associated with the player ID of a player who has performed the third player operation;
- displaying, based on the plurality of selected character IDs that are saved in the party saving area, a first party display area on the display device for the first player and a second party display area on the display device for the second player,
  - wherein the first party display area comprises the plurality of selected ally characters in the first party;

performing, in response to a player input, a copy operation between the first party display area and the second party display area, wherein the first party display area is a copy source for a copied ally character among the plurality of selected ally characters and the second party display area is a copy destination for a second party comprising the copied ally character; and executing a second battle game on the second player terminal using the second party comprising the copied ally character.

10. An information processing system comprising:
a first player terminal comprising a display device, and
a second player terminal connected to the first player terminal over a communication network,
a server,
wherein the first player terminal is configured to execute a first method comprising:
  displaying, using the display device, an ally character confirmation screen comprising a plurality of ally character images corresponding to a first plurality of ally characters,
  accepting a first player operation from a first player,
  receiving, based on the first player operation in response to displaying the ally character confirmation screen, an ally character selection of at least a portion of the first plurality of ally characters for organizing a first party, the ally character selection corresponding to a plurality of selected ally characters, and
  transmitting the ally character selection to the server,
the server is configured to execute a second method comprising:
  receiving the ally character selection transmitted from the first player terminal,
  saving, among a plurality of character IDs associated with a player ID, a plurality of selected character IDs selected by the first player operation in a party saving area associated with the player ID, wherein the plurality of selected character IDs correspond to the plurality of selected ally characters, and wherein the party saving area is located in a storage unit in the server,
  executing a first battle game by using the plurality of selected character IDs stored in the party saving area, wherein the first battle game comprises at least one ally character among the plurality of selected ally characters attacking at least one enemy character,
  creating, in response to the first battle game being terminated, game result information comprising the plurality of selected character IDs of the plurality of selected ally characters that are used for executing the first battle game, and
  transmitting, over a communication network, the game result information between the first player terminal of the first player and the second player terminal based on a second player operation by the first player, and
the server is further configured to execute saving, based on a third player operation in a report screen on the second player terminal that comprises the game result information, the plurality of selected character IDs included in the game result information in the party saving area associated with the player ID of a player who has performed the third player operation,
the second player terminal is configured to execute:
  displaying, based on the plurality of selected character IDs that are saved in the party saving area, a first party display area on the display device for the first player and a second party display area on the display device for the second player,
  wherein the first party display area comprises the plurality of selected ally characters in the first party,
wherein the server is further configured to perform, in response to a player input at the second player terminal, a copy operation between the first party display area and the second party display area,
  wherein the first party display area is a copy source for a copied ally character among the plurality of selected ally characters and the second party display area is a copy destination for a second party comprising the copied ally character; and
wherein the second player terminal is further configured to execute a second battle game on the second player terminal using the second party comprising the copied ally character.

* * * * *